(12) United States Patent
Cui et al.

(10) Patent No.: US 11,159,103 B2
(45) Date of Patent: Oct. 26, 2021

(54) SIX-DEGREE-OF-FREEDOM LARGE-STROKE UNCOUPLING LARGE HOLLOW SERIES-PARALLEL PIEZOELECTRIC MICRO-MOTION PLATFORM

(71) Applicant: Ningbo University, Ningbo (CN)

(72) Inventors: Yuguo Cui, Ningbo (CN); Qifang Xie, Ningbo (CN); Yiling Yang, Ningbo (CN); Guoping Li, Ningbo (CN); Qianjun Shao, Ningbo (CN)

(73) Assignee: Ningbo University, Ningbo (CN)

( * ) Notice: Subject to any disclaimer, the term of this patent is extended or adjusted under 35 U.S.C. 154(b) by 156 days.

(21) Appl. No.: 16/751,163

(22) Filed: Jan. 23, 2020

(65) Prior Publication Data

US 2020/0244190 A1 Jul. 30, 2020

(30) Foreign Application Priority Data

Jan. 30, 2019 (CN) .......................... 201910092067.5

(51) Int. Cl.
  *H02N 2/02* (2006.01)
  *H02N 2/04* (2006.01)
  *H02N 2/00* (2006.01)

(52) U.S. Cl.
  CPC ............ *H02N 2/028* (2013.01); *H02N 2/043* (2013.01); *H02N 2/001* (2013.01); *H02N 2/005* (2013.01); *H02N 2/0095* (2013.01)

(58) Field of Classification Search
  None
  See application file for complete search history.

(56) References Cited

U.S. PATENT DOCUMENTS

| 2003/0086751 | A1* | 5/2003 | Culpepper | .............. F16C 11/12 403/52 |
| 2006/0252297 | A1* | 11/2006 | Culpepper | .............. F16C 11/12 439/374 |
| 2007/0220882 | A1* | 9/2007 | Culpepper | ............ B81B 3/0062 60/527 |

(Continued)

FOREIGN PATENT DOCUMENTS

| CN | 1669744 A | 9/2005 |
| CN | 106847346 A | 6/2017 |

(Continued)

*Primary Examiner* — Emily P Pham
(74) *Attorney, Agent, or Firm* — Bayramogly Law Offices LLC

(57) ABSTRACT

A six-degree-of-freedom large-stroke uncoupling large hollow series-parallel piezoelectric micro-motion platform includes a base, a movable platform top, a second platform and a first platform, wherein a first guide unit, a second guide unit, a third guide unit, a fourth guide unit, a fifth guide unit and a sixth guide unit are respectively connected in sequence to the second platform and the first platform; the first guide unit is internally provided with a first drive unit, the second guide unit is internally provided with a second drive unit, and the third guide unit is internally provided with a third drive unit; and the base is provided with a fourth drive unit, a fifth drive unit, a sixth drive unit and a seventh drive unit, the fifth drive unit is provided below the second drive unit, and the sixth drive unit is provided below the third drive unit.

10 Claims, 17 Drawing Sheets

(56) References Cited

U.S. PATENT DOCUMENTS

2015/0177126 A1\* 6/2015 Tamayo De Miguel .................... G01Q 20/02
73/643

FOREIGN PATENT DOCUMENTS

| CN | 107673305 A | 2/2018 |
| CN | 107863130 A | 3/2018 |

\* cited by examiner

SIX-DEGREE-OF-FREEDOM LARGE-STROKE UNCOUPLING LARGE HOLLOW SERIES-PARALLEL PIEZOELECTRIC MICRO-MOTION PLATFORM

CROSS REFERENCE TO THE RELATED APPLICATIONS

This application is based upon and claims priority to Chinese Patent Application No. 201910092067.5, filed on Jan. 30, 2019, the entire contents of which are incorporated herein by reference.

TECHNICAL FIELD

The present invention belongs to the field of nano-positioning technology, and relates to a micro-displacement mechanism in a nano-positioning system, in particular to a six-degree-of-freedom large-stroke uncoupling large hollow series-parallel piezoelectric micro-motion platform.

BACKGROUND

Piezoelectric micro-motion platforms are micro-displacement mechanisms for transferring displacement and force through a flexible mechanism that can generate elastic deformation under the drive of a piezoelectric actuator. Since the piezoelectric micro-motion platforms have no hinges and bearings, no assembly is needed, no transmission gap exists, and no friction and wear occur. Since the piezoelectric micro-motion platforms are driven by piezoelectric actuators, the displacement resolution can reach nanometer level, the response time can reach millisecond level, the stiffness is large, the size is small, and the load-bearing capacity is strong. Accordingly, the piezoelectric micro-motion platforms are widely used in the technical fields that need micron/nano-positioning, such as precision machining and testing, optical fiber butting, micro-part assembly, and cell micro-manipulation. For example, in the precision and ultra-precision machining, micro-feeding of cutters or compensation of machining errors can be achieved. In the precision measurement, fine adjustment of sensors can be achieved. In scanning probe microscopes, combined with micro-scanning probes, the measurement of micro-structure morphology can be achieved. In the optical fiber butting, precise alignment of two optical fibers with a diameter of several micrometers to dozens of micrometers can be achieved. In the assembly of MEMS (microelectromechanical system), combined with micro clamps, micro shafts and micro gears can be assembled into micro components; and in biological engineering, combined with micro-impact probes, corresponding constituents can be injected into or extracted from cells.

Existing six-degree-of-freedom (movable along x, y, and z directions and rotatable about x, y, and z axes) piezoelectric micro-motion platforms are mostly based on the Stewart parallel platform structure, which is implemented by connecting a movable platform to a fixed platform via six links that realize the driving function. In this implementation, the platform has a high rigidity and fast response, but also has the following disadvantages: due to the long links, the movable platform is far away from the fixed platform, which makes the platform structure huge and not compact; since no displacement amplification mechanism is used, the platform has a small displacement stroke; and the kinematics solution of and motion control over the movable platform are extremely complicated because when same moves in one of the directions, coupled movements in the other two directions will occur, and when same rotates about one of the axes, coupled angular rotations about the other two axes will occur.

SUMMARY

In view of the state of the art, the technical problem to be solved by the present invention is to provide a six-degree-of-freedom large-stroke uncoupling large hollow series-parallel piezoelectric micro-motion platform which has a simple and compact structure, a large working platform top, a large displacement stroke, no displacement coupling and a high inherent frequency, and is easily integrated with displacement sensors.

The technical solution adopted by the present invention to solve the above technical problems is: a six-degree-of-freedom large-stroke uncoupling large hollow series-parallel piezoelectric micro-motion platform, which comprises a base and a movable platform top which is provided above the base and forms a gap therewith; wherein a second platform is provided between the movable platform top and the base and forms gaps therewith; a first platform, which is screwed to the movable platform top, is provided at the center of the second platform and forms a gap therewith; the first platform comprises a first edge, a second edge, a third edge and a fourth edge which are arranged sequentially perpendicular to each other in a counterclockwise direction of the first platform; a first guide unit capable of elastic deformation is connected between the second platform and the first edge; a second guide unit and a third guide unit capable of elastic deformation are respectively connected between the second platform and the second edge; a fourth guide unit capable of elastic deformation is connected between the second platform and the third edge; a fifth guide unit and a sixth guide unit capable of elastic deformation are respectively connected between the second platform and the fourth edge; the first guide unit is internally provided with a first drive unit capable of extending and retracting in the direction of the first platform, the second guide unit is internally provided with a second drive unit capable of extending and retracting in the direction of the first platform, and the third guide unit is internally provided with a third drive unit capable of extending and retracting in the direction of the first platform; and the base is provided with a fourth drive unit, a fifth drive unit, a sixth drive unit and a seventh drive unit which perpendicularly extend and retract to act on the second platform. The fourth drive unit, the fifth drive unit, the sixth drive unit and the seventh drive unit are arranged sequentially in the form of a rectangle, are provided below four corners of the second platform, and are in screwed connection with the second platform; and the fifth drive unit is provided below the second drive unit, and the sixth drive unit is provided below the third drive unit. It is assumed that a z-axis is perpendicular to the movable platform top, an x-axis is from the fifth drive unit to the sixth drive unit, and a y-axis is from the fifth drive unit to the fourth drive unit.

In order to optimize the above technical solutions, the measures taken further include:

the second platform is provided with a first sensor assembly horizontally facing the third edge, and a second sensor assembly and a third sensor assembly horizontally facing the fourth edge;

a fourth sensor assembly vertically facing the second platform is provided between the fourth drive unit and the fifth drive unit; a fifth sensor assembly vertically facing the second platform is provided between the fifth drive unit and the sixth drive unit; and a sixth sensor assembly vertically facing the second platform is provided between the sixth drive unit and the seventh drive unit.

The sixth guide units, namely the first guide unit, the second guide unit, the third guide unit, the fourth guide unit, the fifth guide unit and the sixth guide unit have the same structure, comprising a fifth rigid portion connected to the first platform, and a half-frame-shaped frame body enclosing the outside of the fifth rigid portion, first flexible sheets connected between ends of the frame body and the fifth rigid portion, first protrusions provided on the frame body, second flexible sheets connected to the first protrusions and perpendicular to the first flexible sheets, second protrusions provided on the second platform and connected to the second flexible sheets at the other end thereof. The second protrusions are located between the first protrusions and the first platform.

The first drive unit, the second drive unit and the third drive unit have the same structure, comprising a first bridge-type amplification mechanism and a first piezoelectric actuator provided inside the first bridge-type amplification mechanism. The first piezoelectric actuator is parallel to the first flexible sheet. The first bridge-type amplification mechanism comprises a first rigid portion and a third rigid portion respectively provided at two ends of the first piezoelectric actuator, and a second rigid portion and a fourth rigid portion provided on two sides of the first piezoelectric actuator and forming gaps therewith. A third flexible sheet is connected between adjacent ones of the first rigid portion, the second rigid portion, the third rigid portion and the fourth rigid portion. The distance between one end of the third flexible sheet and a middle section of the first piezoelectric actuator is smaller than the distance between the other end of the third flexible sheet and an end of the first piezoelectric actuator.

The second rigid portion is screwed to the frame body, and the fourth rigid portion is screwed to the fifth rigid portion.

The fourth drive unit, the fifth drive unit, the sixth drive unit and the seventh drive unit have the same structure, comprising a second piezoelectric actuator, and a second bridge-type amplification mechanism and a third bridge-type amplification mechanism which are respectively in the shape of a ring. The second bridge-type amplification mechanism is parallel to the base. Two ends of the second piezoelectric actuator are provided in an abutting manner inside the second bridge-type amplification mechanism. The third bridge-type amplification mechanism is sleeved on the periphery of the second bridge-type amplification mechanism, and the plane where the third bridge-type amplification mechanism is located is perpendicular to the extending and retracting direction of the second piezoelectric actuator. The third bridge-type amplification mechanism is screwed to the second platform and the base.

The second bridge-type amplification mechanism comprises a sixth rigid portion and a seventh rigid portion provided in an abutting manner at two ends of the second piezoelectric actuator, an eighth rigid portion and a ninth rigid portion respectively provided on two sides of the second piezoelectric actuator and forming gaps therewith, and fifth flexible sheets for connecting the sixth rigid portion, the eighth rigid portion, the seventh rigid portion and the ninth rigid portion two by two. The third bridge-type amplification mechanism comprises a tenth rigid portion screwed to the eighth rigid portion, an eleventh rigid portion screwed to the ninth rigid portion, a twelfth rigid portion screwed to the second platform, a thirteenth rigid portion screwed to the base, and seventh flexible sheets for connecting the tenth rigid portion, the twelfth rigid portion, the eleventh rigid portion and the thirteenth rigid portion two by two. The second bridge-type amplification mechanism and the third bridge-type amplification mechanism are respectively diamond-shaped. The first bridge-type amplification mechanism can amplify the input displacement of the first piezoelectric actuator by more than 10 times, thereby greatly enlarging the displacement stroke of the first platform. The second bridge-type amplification mechanism and the third bridge-type amplification mechanism can amplify the input displacement of the second piezoelectric actuator by more than 10 times, thereby greatly enlarging the displacement stroke of the second platform 2.

In the upper platform, a pair of third flexible sheet and fourth flexible sheet arranged in parallel in the first bridge-type amplification mechanism constitute a single parallel four-link mechanism with the second rigid portion and the first rigid portion, and a pair of third flexible sheet and fourth flexible sheet arranged in parallel on the other side of the second rigid portion also constitute a single parallel four-link mechanism with the second rigid portion and the third rigid portion, such that the two single parallel four-link mechanisms constitute a dual parallel four-link mechanism. Similarly, the third flexible sheets and the fourth flexible sheets located on two sides of the fourth rigid portion also constitute a dual parallel four-link mechanism with the fourth rigid portion, the first rigid portion and the third rigid portion. When the first piezoelectric actuator receives a voltage, the above dual parallel four-link mechanisms enable the drive units to output a strict translational displacement through the fourth rigid portion without generating a parasitic displacement.

The first sensor assembly, the second sensor assembly and the third sensor assembly have the same structure, comprising a pedestal screwed to the frame body, and a sensor probe screwed to the pedestal, wherein the sensor probe is directly opposite the fifth rigid portion.

The fourth sensor assembly, the fifth sensor assembly and the sixth sensor assembly have the same structure, comprising a pedestal screwed to the base, and a sensor probe screwed to the pedestal, wherein the sensor probe is directly opposite the second platform.

The pedestal comprises a first plate fixed to the base or the frame body, and a second plate parallel to the first plate and fixedly connected to the sensor probe. A pair of flexible folded beams are connected between the first plate and the second plate. The center of the first plate is provided with a first threaded hole, and a first screw with an end abutting against the second plate is screwed into the first threaded hole.

The second platform is provided with a first accommodation groove for accommodating the first platform and forming a gap therewith, and a second accommodation groove located at an edge of the first accommodation groove and used for accommodating the first guide unit, the second guide unit, the third guide unit, the fourth guide unit, the fifth guide unit and the sixth guide unit. The frame bodies and the second flexible sheets are provided inside the second accommodation groove and form gaps therewith.

The first platform is higher than upper surfaces of the second platform, the first drive unit, the second drive unit and the third drive unit. The first bridge-type amplification mechanism further comprises fourth flexible sheets for sequentially connecting the first rigid portion, the second rigid portion, the third rigid portion and the fourth rigid portion. The fourth flexible sheets are provided between the third flexible sheets and the first piezoelectric actuator and form gaps therewith.

The second bridge-type amplification mechanism further comprises sixth flexible sheets connected sequentially for connecting adjacent ones of the sixth rigid portion, the eighth rigid portion, the seventh rigid portion and the ninth rigid portion. The sixth flexible sheets are provided between the second piezoelectric actuator and the fifth flexible sheets and form gaps therewith. In the lower platform, a pair of fifth flexible sheet and sixth flexible sheet arranged in parallel in the second bridge-type amplification mechanism constitute a single parallel four-link mechanism with the eighth rigid portion and the sixth rigid portion, and a pair of fifth flexible sheet and sixth flexible sheet arranged in parallel on the other side of the eighth rigid portion also constitute a single parallel four-link mechanism with the eighth rigid portion and the seventh rigid portion, such that the two single parallel four-link mechanisms constitute a dual parallel four-link mechanism. Similarly, the fifth flexible sheets and the sixth flexible sheets located on two sides of the ninth rigid portion also constitute a dual parallel four-link mechanism with the ninth rigid portion, the sixth rigid portion and the seventh rigid portion. When the second piezoelectric actuator receives a voltage, the above dual parallel four-link mechanisms enable the eighth rigid portion and the ninth rigid portion to output a strict translational displacement along an axis of third threaded holes in the two rigid portions, such that the twelfth rigid portion also outputs a strict translational displacement along the z-axis without generating a parasitic displacement.

In the lower platform, the seventh flexible sheets in the third bridge-type amplification mechanism enable the twelfth rigid portion to rotate both about the x-axis and the y-axis, and enables the twelfth rigid portion to rotate about one axis without generating a coupled angular rotation about the other axis, and therefore enables the second platform to rotate about one axis without generating a coupled angular rotation about the other axis.

An enclosure is provided on the periphery of the base, and a tubular body penetrating the base is provided at the center thereof. The enclosure is provided below the second platform and forms a gap therewith. The tubular body is provided below the first platform and forms a gap therewith. The movable platform top is provided with a first hollow hole adapted to the contour of the tubular body. The first platform is provided with a second hollow hole adapted to the contour of the tubular body.

The first platform, the second platform, the first guide unit, the second guide unit, the third guide unit, the fourth guide unit, the fifth guide unit and the sixth guide unit are of an integrally formed structure, that is, the first platform, the second platform and the flexible guide members are integrally formed by means of cutting. The base, the first bridge-type amplification mechanism, the second bridge-type amplification mechanism, the third bridge-type amplification mechanism, and the pedestal are respectively of an integrally formed structure.

Compared with the prior art, the six-degree-of-freedom large-stroke uncoupling large hollow series-parallel piezoelectric micro-motion platform of the present invention comprises a base and a movable platform top which is provided above the base and forms a gap therewith; wherein a second platform is provided between the movable platform top and the base and forms gaps therewith; a first platform, which is screwed to the movable platform top, is provided at the center of the second platform and forms a gap therewith; the first platform comprises a first edge, a second edge, a third edge and a fourth edge which are arranged sequentially perpendicular to each other in a counterclockwise direction of the first platform; a first guide unit capable of elastic deformation is connected between the second platform and the first edge; a second guide unit and a third guide unit capable of elastic deformation are respectively connected between the second platform and the second edge; a fourth guide unit capable of elastic deformation is connected between the second platform and the third edge; a fifth guide unit and a sixth guide unit capable of elastic deformation are respectively connected between the second platform and the fourth edge; the first guide unit is internally provided with a first drive unit capable of extending and retracting in the direction of the first platform, the second guide unit is internally provided with a second drive unit capable of extending and retracting in the direction of the first platform, and the third guide unit is internally provided with a third drive unit capable of extending and retracting in the direction of the first platform; and the base is provided with a fourth drive unit, a fifth drive unit, a sixth drive unit and a seventh drive unit which perpendicularly extend and retract to act on the second platform. The fourth drive unit, the fifth drive unit, the sixth drive unit and the seventh drive unit are arranged sequentially in the form of a rectangle, are provided below four corners of the second platform, and are in screwed connection with the second platform; and the fifth drive unit is provided below the second drive unit, and the sixth drive unit is provided below the third drive unit. Compared with the existing six-degree-of-freedom piezoelectric micro-motion platforms, the present invention has the advantages as follows.

1) The entire micro-motion platform is composed of two layers connected in series, namely upper and lower layers, and each layer is of a parallel structure, wherein for the upper platform, a movable platform, i.e. the first platform is driven by the first drive unit, the second drive unit and the third drive unit to realize the translations of the movable platform top in the x- and y-directions and the rotation thereof about the z-axis; and for the lower platform, a further movable platform, i.e. the second platform is driven by the fourth drive unit, the fifth drive unit, the sixth drive unit and the seventh drive unit to realize the translation of the movable platform top in the z-direction and the rotations thereof about the x- and y-axes. The output direction of the drive units is perpendicular to the axis of the piezoelectric actuator. In this way, the axis of the piezoelectric actuator in the upper platform is parallel to the edges of the first and second platforms, the drive units can be closely combined with the first platform and the second platform, the axis of the piezoelectric actuator in the lower platform is also parallel to the second platform and a bottom face of the base, and the movable platform top is close to the bottom face of the base, so that the micro-motion platform has a simple and compact overall structure and a large working platform top.

3) The bridge-type amplification mechanisms in the drive units can amplify the input displacement of the piezoelectric actuators by more than 10 times, thereby greatly enlarging the displacement stroke of the movable platform top.

3) In the upper platform, a pair of second flexible sheets and a frame body in each guide unit constitute a single parallel four-link mechanism with the second platform, and the two oppositely-arranged guide units constitute a dual parallel four-link mechanism through their respective pairs of second flexible sheets and the frame bodies together with the second platform. When a voltage is applied to the first drive unit and the same voltage is applied to the second drive unit and third drive unit at the same time, the movable platform body and the movable platform top output strict translational displacements in the x and y directions without generating a parasitic displacement.

4) In the upper platform, a pair of third flexible sheet and fourth flexible sheet arranged in parallel in the first bridge-type amplification mechanism constitute a single parallel four-link mechanism with the second rigid portion and the first rigid portion, and a pair of third flexible sheet and fourth flexible sheet arranged in parallel on the other side of the second rigid portion also constitute a single parallel four-link mechanism with the second rigid portion and the third rigid portion, such that the two single parallel four-link mechanisms constitute a dual parallel four-link mechanism. Similarly, the third flexible sheets and the fourth flexible sheets located on two sides of the fourth rigid portion also constitute a dual parallel four-link mechanism with the fourth rigid portion, the first rigid portion and the third rigid portion. When the first piezoelectric actuator receives a voltage, the above dual parallel four-link mechanisms enable the drive units to output a strict translational displacement through the fourth rigid portion without generating a parasitic displacement.

5) In the lower platform, a pair of fifth flexible sheet and sixth flexible sheet arranged in parallel in the second bridge-type amplification mechanism constitute a single parallel four-link mechanism with the eighth rigid portion and the sixth rigid portion, and a pair of fifth flexible sheet and sixth flexible sheet arranged in parallel on the other side of the eighth rigid portion also constitute a single parallel four-link mechanism with the eighth rigid portion and the seventh rigid portion, such that the two single parallel four-link mechanisms constitute a dual parallel four-link mechanism. Similarly, the fifth flexible sheets and the sixth flexible sheets located on two sides of the ninth rigid portion also constitute a dual parallel four-link mechanism with the ninth rigid portion, the sixth rigid portion and the seventh rigid portion. When the second piezoelectric actuator receives a voltage, the above dual parallel four-link mechanisms enable the eighth rigid portion and the ninth rigid portion to output a strict translational displacement along an axis of third threaded holes in the two rigid portions, such that the twelfth rigid portion also outputs a strict translational displacement in the z-direction without generating a parasitic displacement.

6) In the lower platform, the seventh flexible sheets in the third bridge-type amplification mechanism enable the twelfth rigid portion to rotate both about the x-axis and the y-axis, and enables the twelfth rigid portion to rotate about one axis without generating a coupled angular rotation about the other axis, and therefore enables the second platform to rotate about one axis without generating a coupled angular rotation about the other axis.

7) The upper platform has no coupled movement when implementing the translations of the movable platform top in the x- and y-directions and the rotation thereof about the z-axis, and the lower platform also has no coupled movement when implementing the translation of the movable platform top in the z direction and the rotations thereof about the x- and y-axes. so that the kinematics solution of and motion control over the movable platform top become simple and easy.

8) In the upper platform, the guide units have relatively large rectangular through holes, leaving enough space for the integration of displacement sensors (such as capacitive displacement sensors) into the upper platform; whereas in the lower platform, the drive units have a compact overall structure and are enabled to be arranged at the four corners of the base, leaving enough space for the integration of displacement sensors (such as capacitive displacement sensors) into the base, so that the displacement sensors (such as capacitive displacement sensors) can be easily integrated.

9) In the upper platform, a pair of second flexible sheets of each guide unit are located outside the first platform, the drive unit and the displacement sensor are located in the guide unit; whereas in the lower platform, the drive unit is close to the four corners of the base, and the displacement sensor is close to the enclosure of the base, so that the movable platform top and the tubular body have a large hollow, which can not only significantly reduce the mass of the movable platform body and the movable platform top, but can also greatly improve the inherent frequency of the platform. In addition, when the platform is used as an adjustment mechanism of an optical system, such a large hollow hole can be used as a large light transmission aperture.

DETAILED DESCRIPTION OF THE EMBODIMENTS

Figure 1:
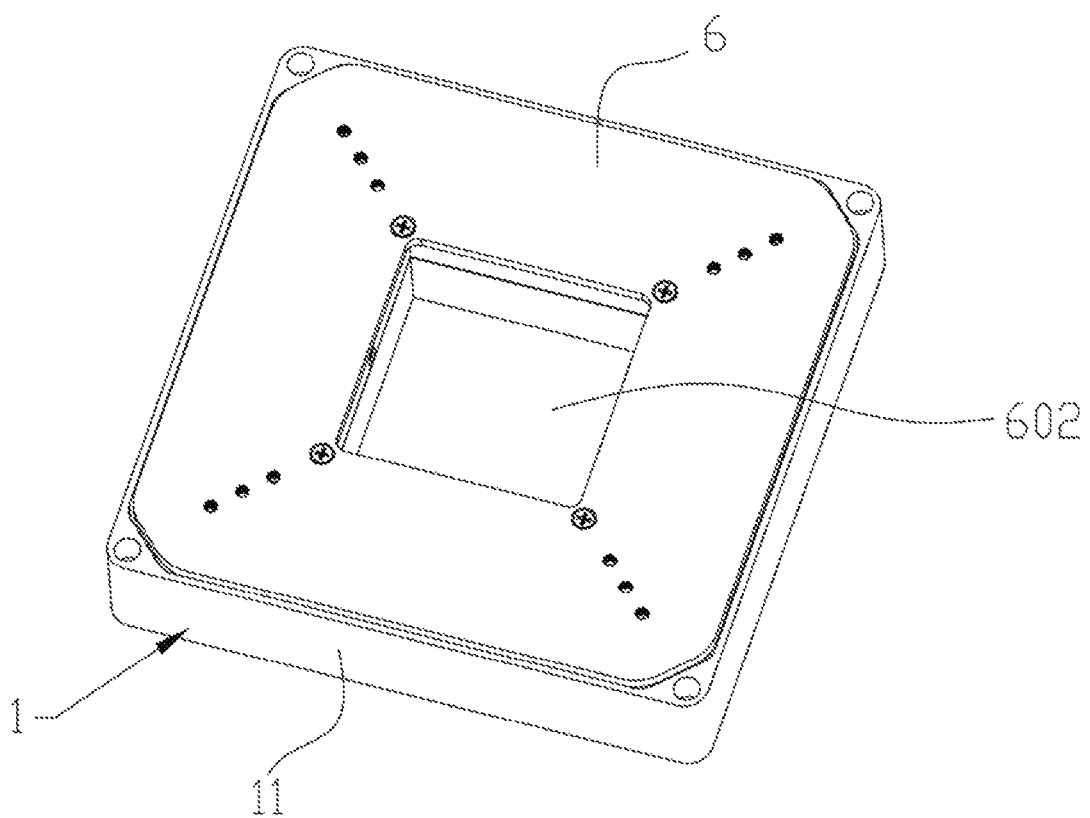
FIG. 1 is a perspective schematic structural diagram of the present invention.

Embodiments of the present invention will be further described in detail below in conjunction with the accompanying drawings.

FIGS. 1 to 17 are schematic structural diagrams of the present invention, in which the reference numerals are as follows: base 1, first guide unit 101, second guide unit 102, third guide unit 103, fourth guide unit 104, fifth guide unit 105, sixth guide unit 106, enclosure 11, tubular body 12, second platform 2, first accommodation groove 21, second accommodation groove 22, first drive unit 31, second drive unit 32, third drive unit 33, fourth drive unit 34, fifth drive unit 35, sixth drive unit 36, seventh drive unit 37, first sensor assembly 41, second sensor assembly 42, third sensor assembly 43, fourth sensor assembly 44, fifth sensor assembly 45, sixth sensor assembly 46, first platform 5, first edge 51, second edge 52, third edge 53, fourth edge 54, second hollow hole 55, movable platform top 6, first hollow hole 602, second bridge-type amplification mechanism 61, sixth rigid portion 611, seventh rigid portion 612, eighth rigid portion 613, ninth rigid portion 614, fifth flexible sheet 615, sixth flexible sheet 616, third bridge-type amplification mechanism 62, second piezoelectric actuator 63, tenth rigid portion 621, eleventh rigid portion 622, twelfth rigid portion 623, thirteenth rigid portion 624, seventh flexible sheet 625, fifth rigid portion 71, first flexible sheet 72, frame body 73, first protrusion 74, second flexible sheet 75, second protrusion 76, first bridge-type amplification mechanism 8, first rigid portion 81, second rigid portion 82, third rigid portion 83, fourth rigid portion 84, first piezoelectric actuator 85, third flexible sheet 86, fourth flexible sheet 87, first plate 91, first threaded hole 911, first screw 912, flexible folded beam 92, second plate 93, sensor probe 94, and pedestal 95.

Figure 2:
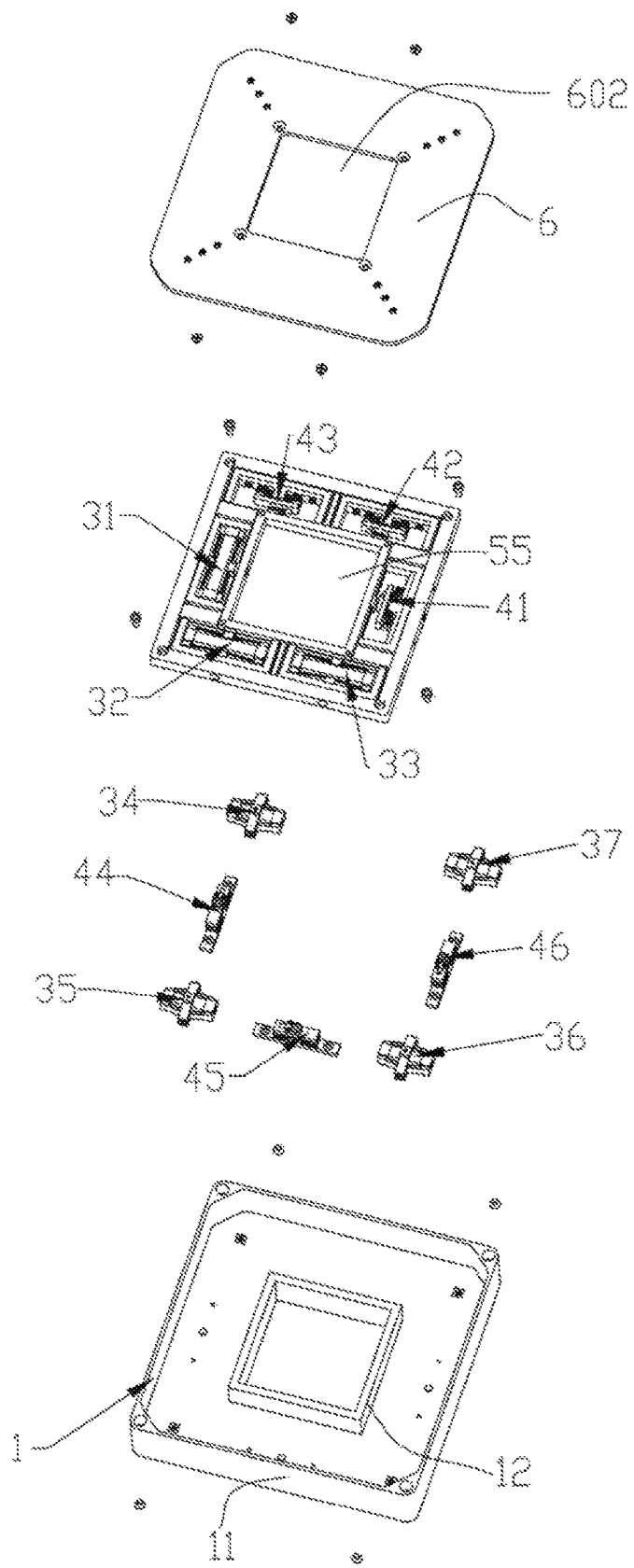
FIG. 2 is an exploded schematic diagram of FIG. 1.
Figure 3:
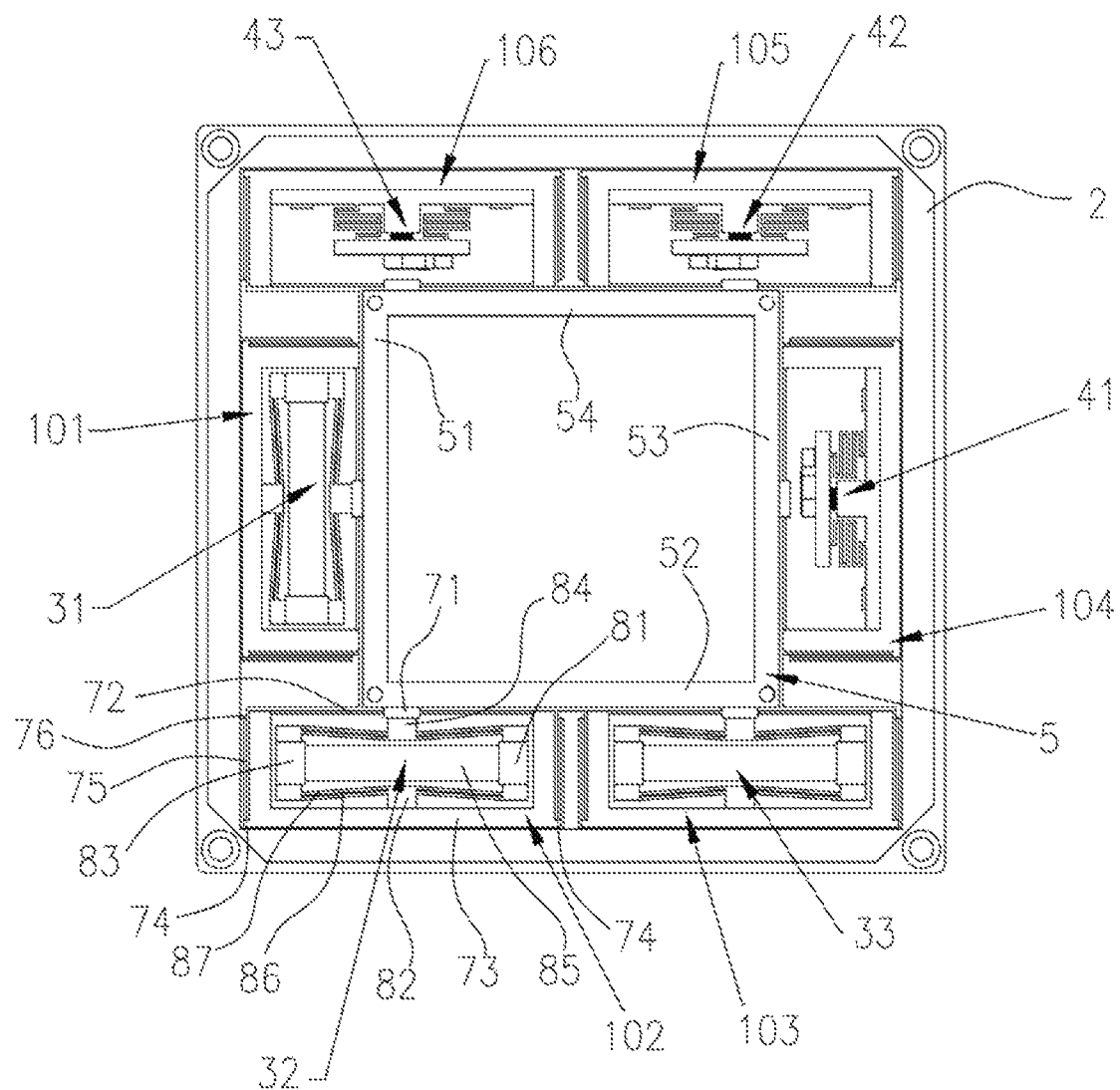
FIG. 3 is a schematic structural diagram of a first platform and a second platform in FIG. 2 after being assembled together.
Figure 4:
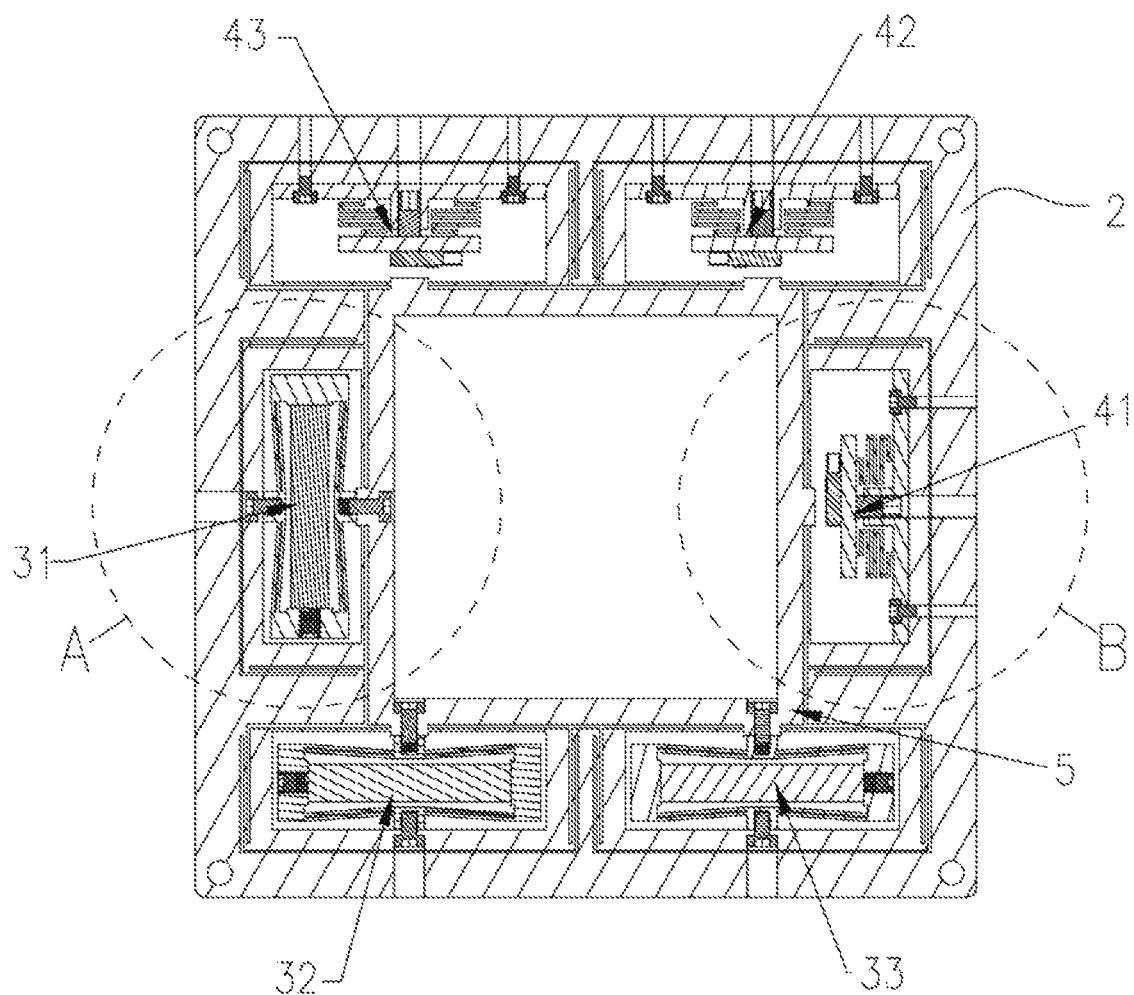
FIG. 4 is a schematic full sectional diagram of FIG. 3.

FIGS. 1 to 17 are schematic structural diagrams of the present invention. As shown in FIG. 2, a six-degree-of-freedom large-stroke uncoupling large hollow series-parallel piezoelectric micro-motion platform comprises a base 1 and a movable platform top 6 which is provided above the base 1 and forms a gap therewith. A second platform 2 is provided between the movable platform top 6 and the base 1 and forms gaps therewith. A first platform 5, which is screwed to the movable platform top 6, is provided at the center of the second platform 2 and forms a gap therewith. The first platform 5 comprises a first edge 51, a second edge 52, a third edge 53 and a fourth edge 54 which are arranged sequentially perpendicular to each other in a counterclockwise direction of the first platform. A first guide unit 101 capable of elastic deformation is connected between the second platform 2 and the first edge 41. A second guide unit 102 and a third guide unit 103 capable of elastic deformation are respectively connected between the second platform 2 and the second edge 42. A fourth guide unit 104 capable of elastic deformation is connected between the second platform 2 and the third edge 41. A fifth guide unit 105 and a sixth guide unit 106 capable of elastic deformation are respectively connected between the second platform 2 and the fourth edge 41. The first guide unit 101 is internally provided with a first drive unit 31 capable of extending and retracting in the direction of the first platform 5, the second guide unit 102 is internally provided with a second drive unit 32 capable of extending and retracting in the direction of the first platform 5, and the third guide unit 103 is internally provided with a third drive unit 33 capable of extending and retracting in the direction of the first platform 5. The base 1 is provided with a fourth drive unit 34, a fifth drive unit 35, a sixth drive unit 36 and a seventh drive unit 37 which perpendicularly extend and retract to act on the second platform 2. The fourth drive unit 34, the fifth drive unit 35, the sixth drive unit 36 and the seventh drive unit 37 are arranged sequentially in the form of a rectangle, are provided below four corners of the second platform 2, and are in screwed connection with the second platform 2. The fifth drive unit 35 is provided below the second drive unit 32, and the sixth drive unit 36 is provided below the third drive unit 33. In an non-working state, the first drive unit 31, the second drive unit 32 and the third drive unit 33 are connected to the edges of the first platform 5. The first drive unit 31, the second drive unit 32, the third drive unit 33, the fourth drive unit 34, the fifth drive unit 35, the sixth drive unit 36 and the seventh drive unit 37 are any linear motors, and are preferably linear motors having piezoelectric actuators.

It is assumed that a z-axis is perpendicular to the movable platform top 6, and an x-axis is from the fifth drive unit 35 to the sixth drive unit 36. A y-axis is from the fifth drive unit 35 to the fourth drive unit 34. By coordinating and controlling the movements of the first drive unit 31, the second drive unit 32 and the third drive unit 33, the movable platform top 6 can generate two translations and one rotation. Moreover, by coordinating and controlling the movements of the fourth drive unit 34, the fifth drive unit 35, the sixth drive unit 36 and the seventh drive unit 37, the movable platform top 6 can generate the other three movements, i.e., two rotations and one translation.

In an embodiment, as shown in FIGS. 2, 3, 4, 5 and 6, the fourth guide unit 104 is internally provided with a first sensor assembly 41 facing the third edge 53, the fifth guide unit 105 is internally provided with a second sensor assembly 42 facing the fourth edge 54, and the sixth guide unit 106 is internally provided with a third sensor assembly 43 facing the fourth edge 54. The first sensor assembly 41 can detect the displacement amount of the third edge 53, and the second sensor assembly 42 and the third sensor assembly 43 can detect the displacement amounts of the fourth edge 54, comprising the rotation angle of the first platform 5 about the z-axis.

As shown in FIG. 2, a fourth sensor assembly 44 vertically facing the second platform 2 is provided between the fourth drive unit 34 and the fifth drive unit 35. A fifth sensor assembly 45 vertically facing the second platform 2 is provided between the fifth drive unit 35 and the sixth drive unit 36. A sixth sensor assembly 46 vertically facing the second platform 2 is provided between the sixth drive unit 36 and the seventh drive unit 37. The fourth sensor assembly 44, the fifth sensor assembly 45 and the sixth sensor assembly 46 can detect the displacement amounts of the second platform 2, comprising the displacement amount lifted along the z-axis, the displacement amount rotated along the x-axis, and the displacement amount rotated along the y-axis.

In the embodiment, as shown in FIGS. 2, 3, 4, 5, 6, 7 and 11, the sixth guide units, namely the first guide unit 101, the second guide unit 102, the third guide unit 103, the fourth guide unit 104, the fifth guide unit 105 and the sixth guide unit 106 have the same structure, comprising a fifth rigid portion 71 connected to the first platform 5, and a half-frame-shaped frame body 73 enclosing the outside of the fifth rigid portion 71, first flexible sheets 72 connected between ends of the frame body 73 and the fifth rigid portion 71, first protrusions 74 provided on the frame body 73, second flexible sheets 75 connected to the first protrusions 74 and perpendicular to the first flexible sheets 72, second protrusions 76 provided on the second platform 2 and connected to the second flexible sheets 75 at the other end thereof. The second protrusions 76 are located between the first protrusions 74 and the first platform 5.

Figure 7:
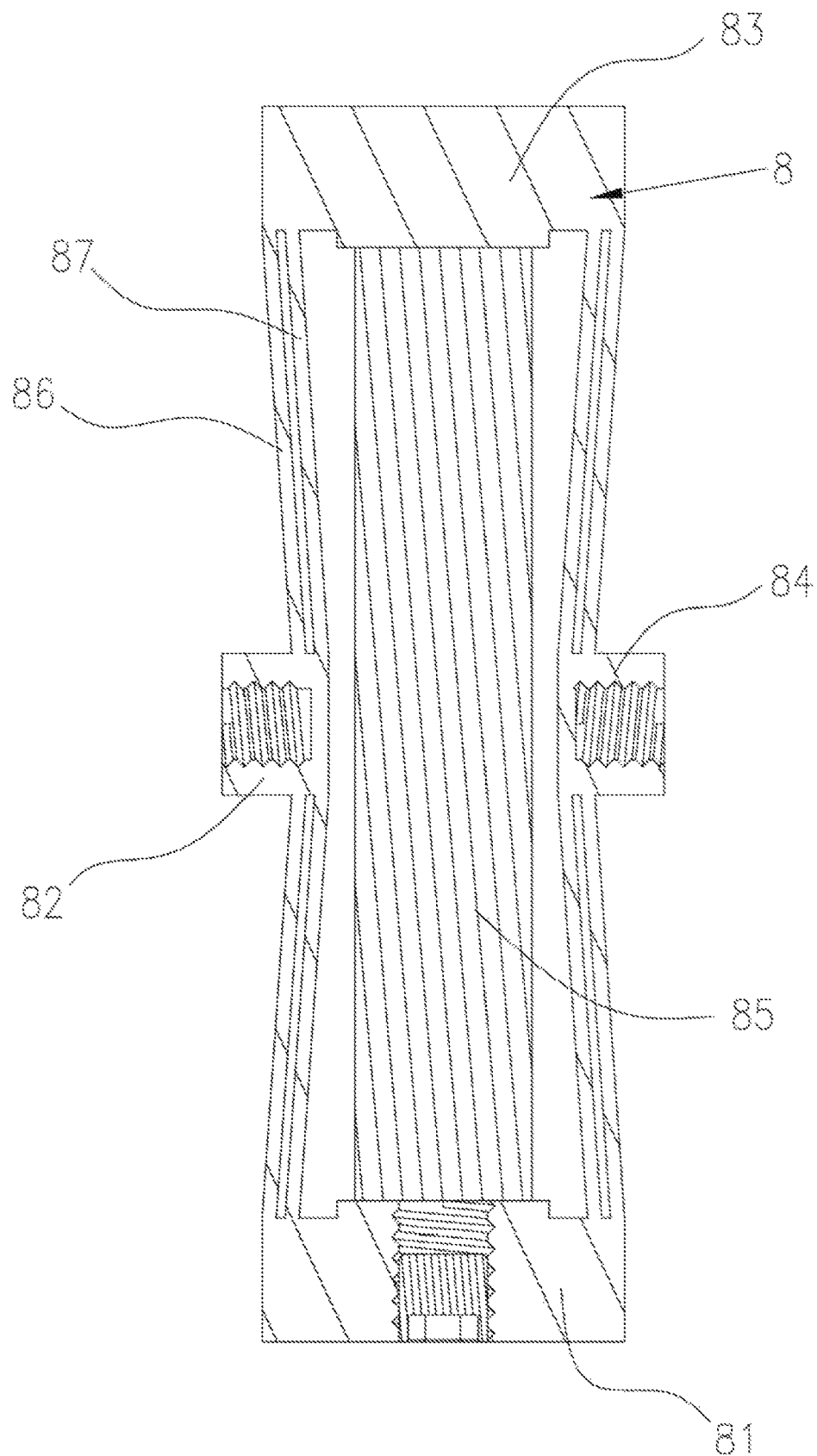
FIG. 7 is a schematic structural diagram of a first drive unit in FIG. 6.
Figure 8:
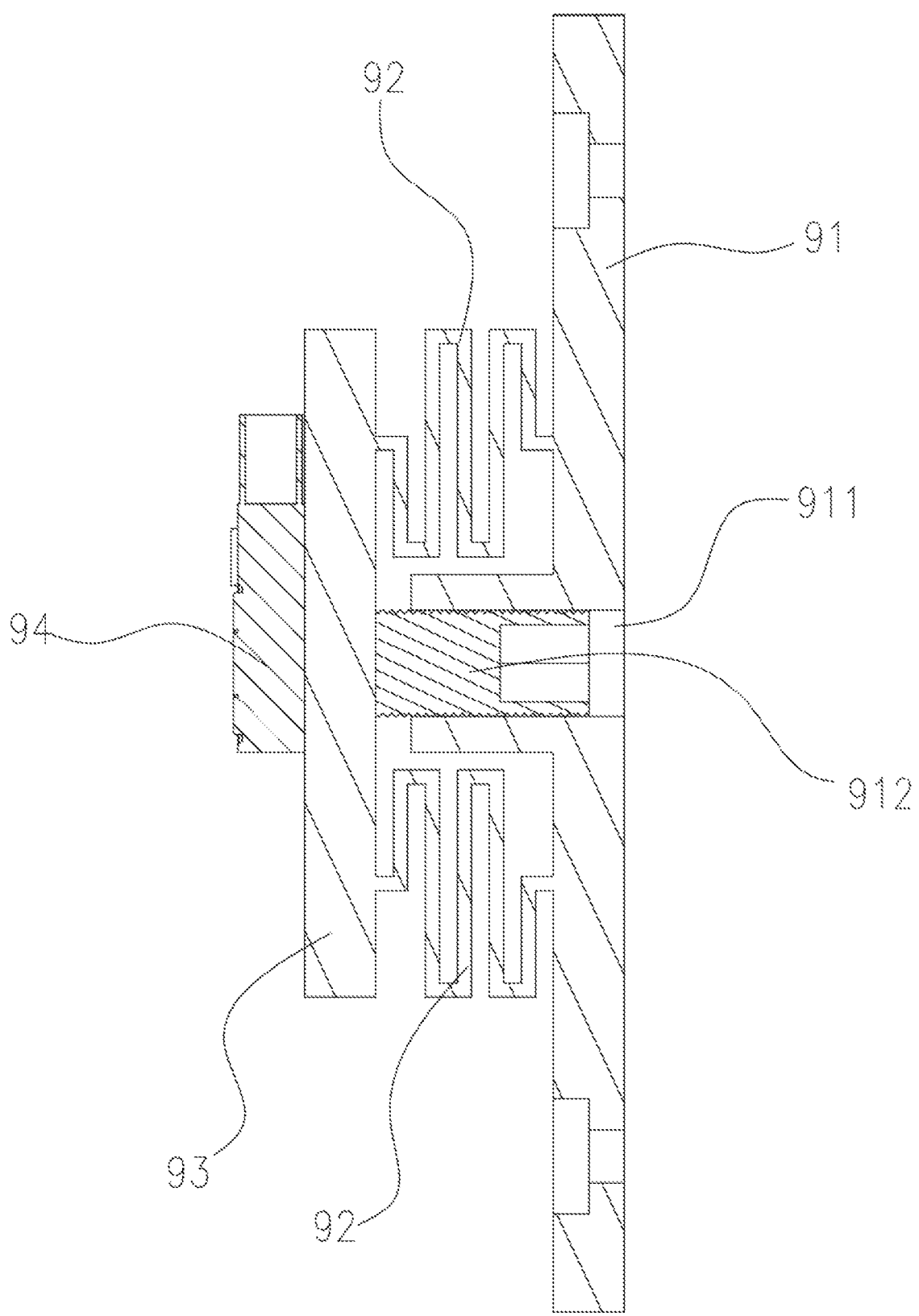
FIG. 8 is a schematic structural diagram of a first sensor assembly in FIG. 6.
Figure 11:
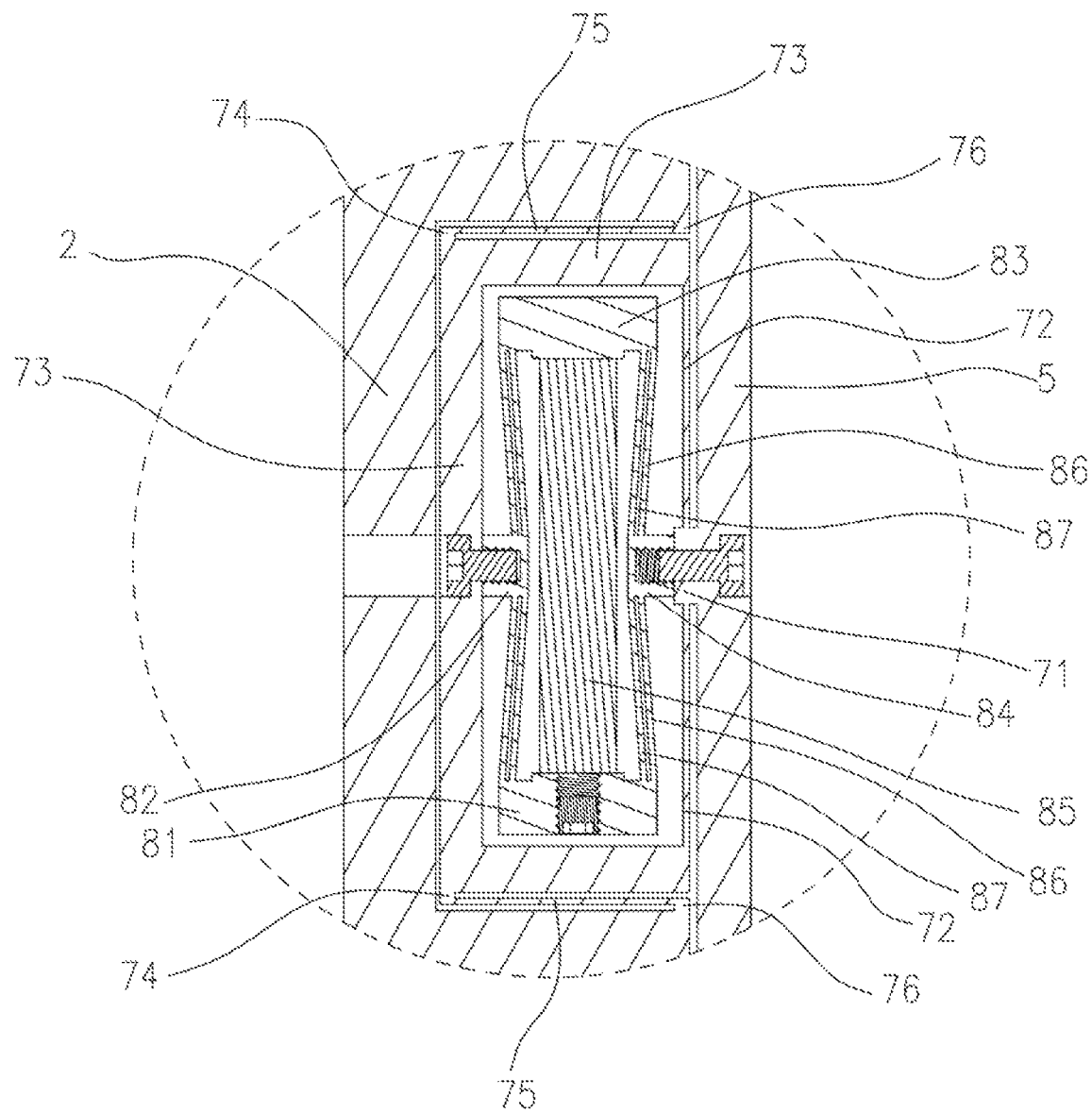
FIG. 11 is an enlarged schematic diagram of a portion A in FIG. 4.

As shown in FIGS. 7 and 11, the first drive unit 31, the second drive unit 32 and the third drive unit 33 have the same structure, comprising a first bridge-type amplification mechanism 8 and a first piezoelectric actuator 85 provided inside the first bridge-type amplification mechanism 8. The first piezoelectric actuator 85 is parallel to the first flexible sheet 72. The first bridge-type amplification mechanism 8 comprises a first rigid portion 81 and a third rigid portion 83 respectively provided at two ends of the first piezoelectric actuator 85, and a second rigid portion 82 and a fourth rigid portion 84 provided on two sides of the first piezoelectric actuator 85 and forming gaps therewith. A third flexible sheet 86 is connected between adjacent ones of the first rigid portion 81, the second rigid portion 82, the third rigid portion 83 and the fourth rigid portion 84. The distance between one end of the third flexible sheet 86 and a middle section of the first piezoelectric actuator 85 is smaller than the distance between the other end of the third flexible sheet 86 and an end of the first piezoelectric actuator 85. When the first piezoelectric actuator 85 is energized and extended, the first piezoelectric actuator 85 pushes the first rigid portion 81 and the third rigid portion 83 away from each other, and the third flexible sheet 86 is straightened by the first rigid portion 81 and the third rigid portion 83, the second rigid portion 82 and the fourth rigid portion 84 are then separated from each other, and finally the fourth rigid portion 84 pushes a movable platform body 4 to move via the fifth rigid portion 71. The bridge-type amplification mechanism composed of the third flexible sheets 86, the first rigid portion 81, the second rigid portion 82, the third rigid portion 83 and the fourth rigid portion 84 can amplify the input displacement of the first piezoelectric actuator 85 by more than 10 times, thereby greatly enlarging the displacement stroke of the first platform 5 and the movable platform top 6. The second rigid portion 82 is screwed to the frame body 73, and the fourth rigid portion 84 is screwed to the fifth rigid portion 71.

The fourth drive unit 34, the fifth drive unit 35, the sixth drive unit 36 and the seventh drive unit 37 have the same structure, comprising a second piezoelectric actuator 63, and a second bridge-type amplification mechanism 61 and a third bridge-type amplification mechanism 62 which are respectively in the shape of a ring. The second bridge-type amplification mechanism 61 is parallel to the base 1. Two ends of the second piezoelectric actuator 63 are provided in an abutting manner inside the second bridge-type amplification mechanism 61. The third bridge-type amplification mechanism 62 is sleeved on the periphery of the second bridge-type amplification mechanism 61, and the plane where the third bridge-type amplification mechanism 62 is located is perpendicular to the extending and retracting direction of the second piezoelectric actuator 63. The third bridge-type amplification mechanism 62 is screwed to the second platform 2 and the base 1. The first bridge-type amplification mechanism 8 can amplify the input displacement of the first piezoelectric actuator 85 by more than 10 times, thereby greatly enlarging the displacement stroke of the first platform 5. The second bridge-type amplification mechanism 61 and the third bridge-type amplification mechanism 62 can amplify the input displacement of the second piezoelectric actuator 63 by more than 10 times, thereby greatly enlarging the displacement stroke of the second platform 2.

After the first piezoelectric actuator 85 is energized, the first piezoelectric actuator 85 is extended and stretches the first rigid portion 81 and the third rigid portion 83, and the third flexible sheet 86 that was originally inclined to the first piezoelectric actuator 85 will be straightened, the second rigid portion 82 and the fourth rigid portion 84 are then pulled apart from each other, and finally the fourth rigid portion 84 pushes the first platform 5 via the fifth rigid portion 71. The guide units provide support for the first bridge-type amplification mechanism 8. All the first protrusions 74, the second protrusions 76 and the second flexible sheets 75 in the same guide unit constitute a parallel four-link mechanism, and two oppositely-arranged guide units constitute a dual parallel four-link mechanism. The dual parallel four-link mechanism can prevent the platform from generating coupled angular rotation during translation. Since when outputting displacement in a certain direction, the first platform 5 is guided by the guide unit in that direction, the first platform 5 will produce a strict linear displacement when translating in that direction, and will not generate coupled displacements in other directions, so that the movement accuracy of the movable platform top 6 is greatly improved.

Figure 15:
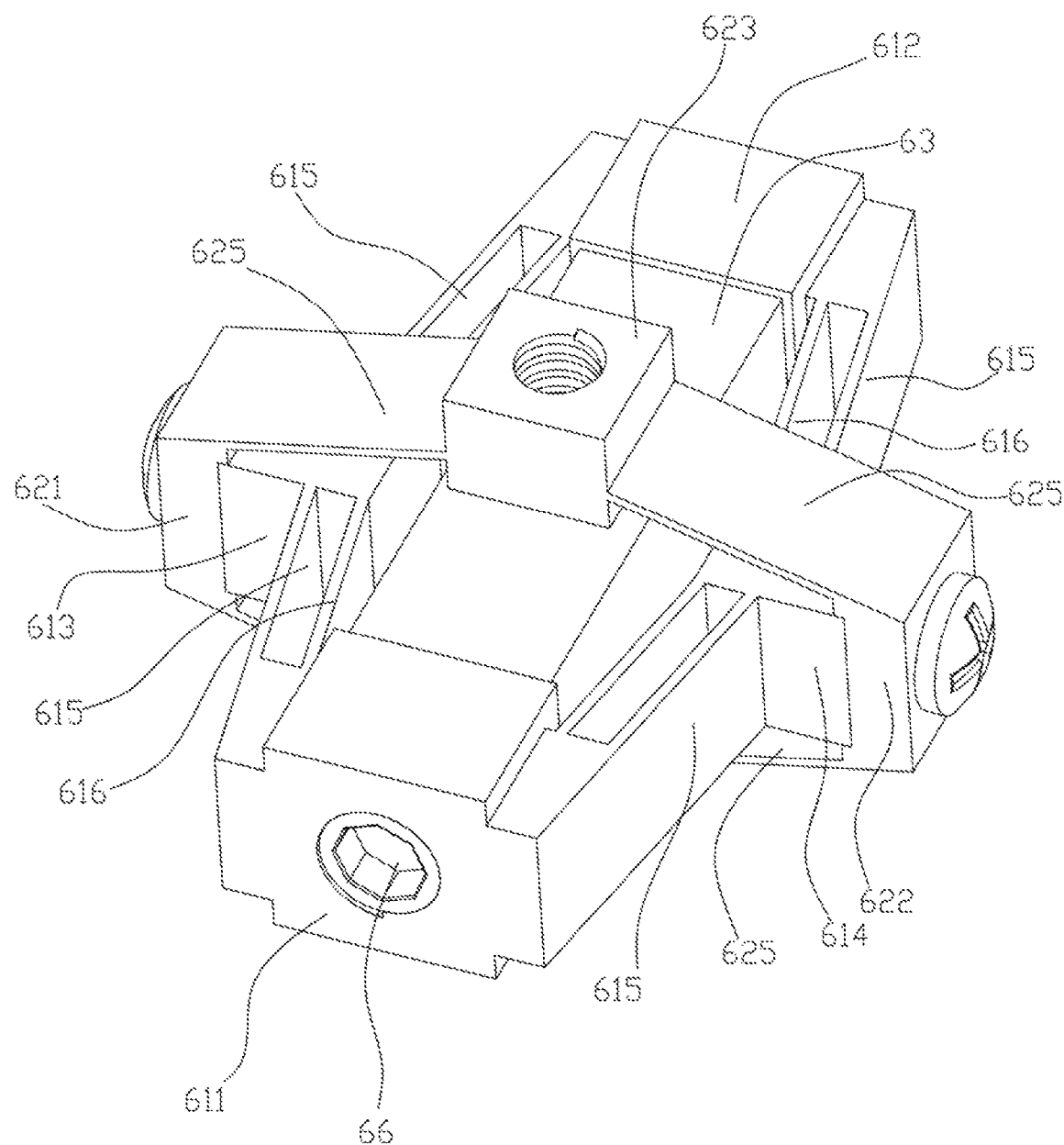
FIG. 15 is a perspective schematic structural diagram of a first drive unit in FIG. 2.
Figure 16:
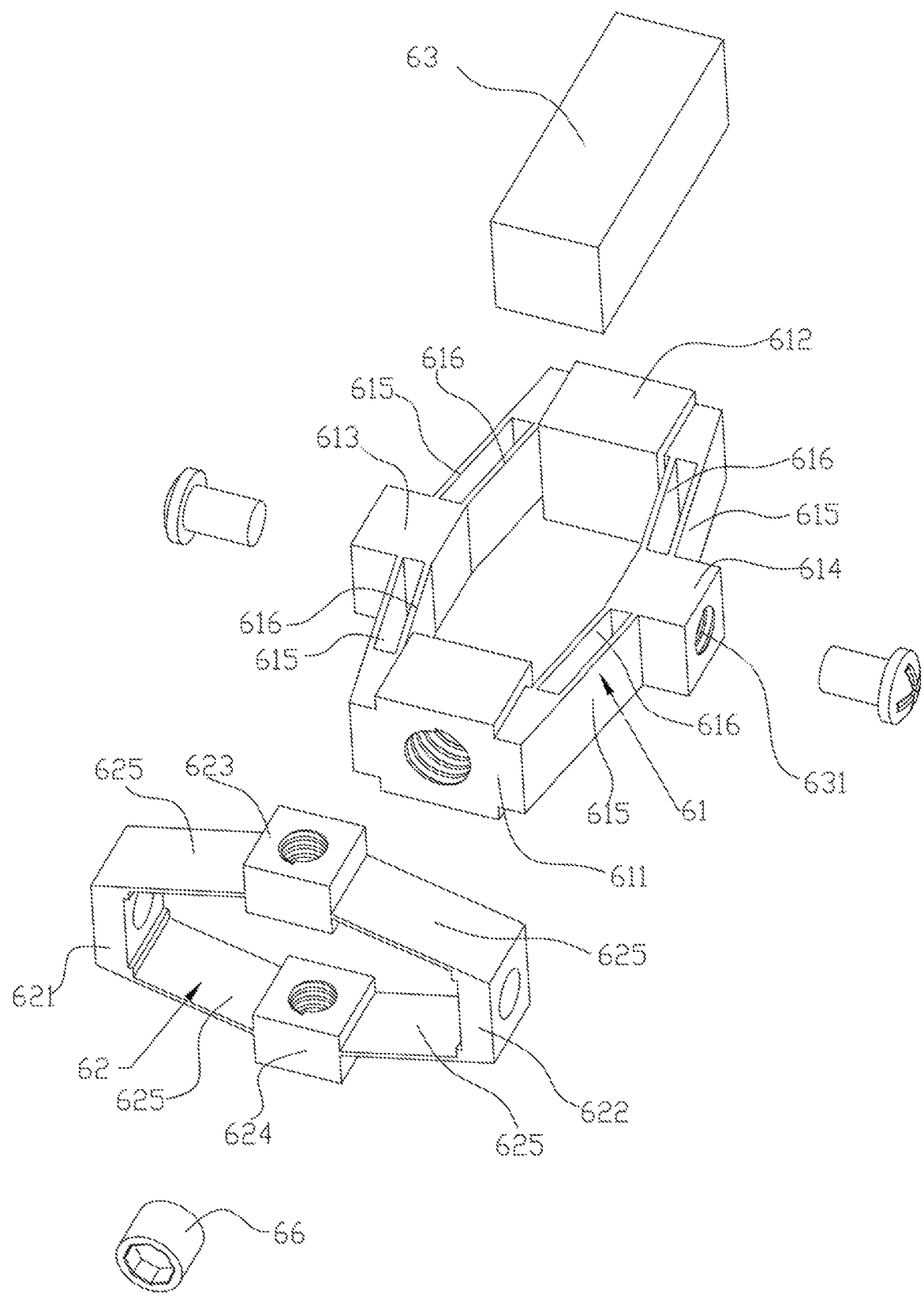
FIG. 16 is an exploded schematic diagram of FIG. 15.
Figure 17:
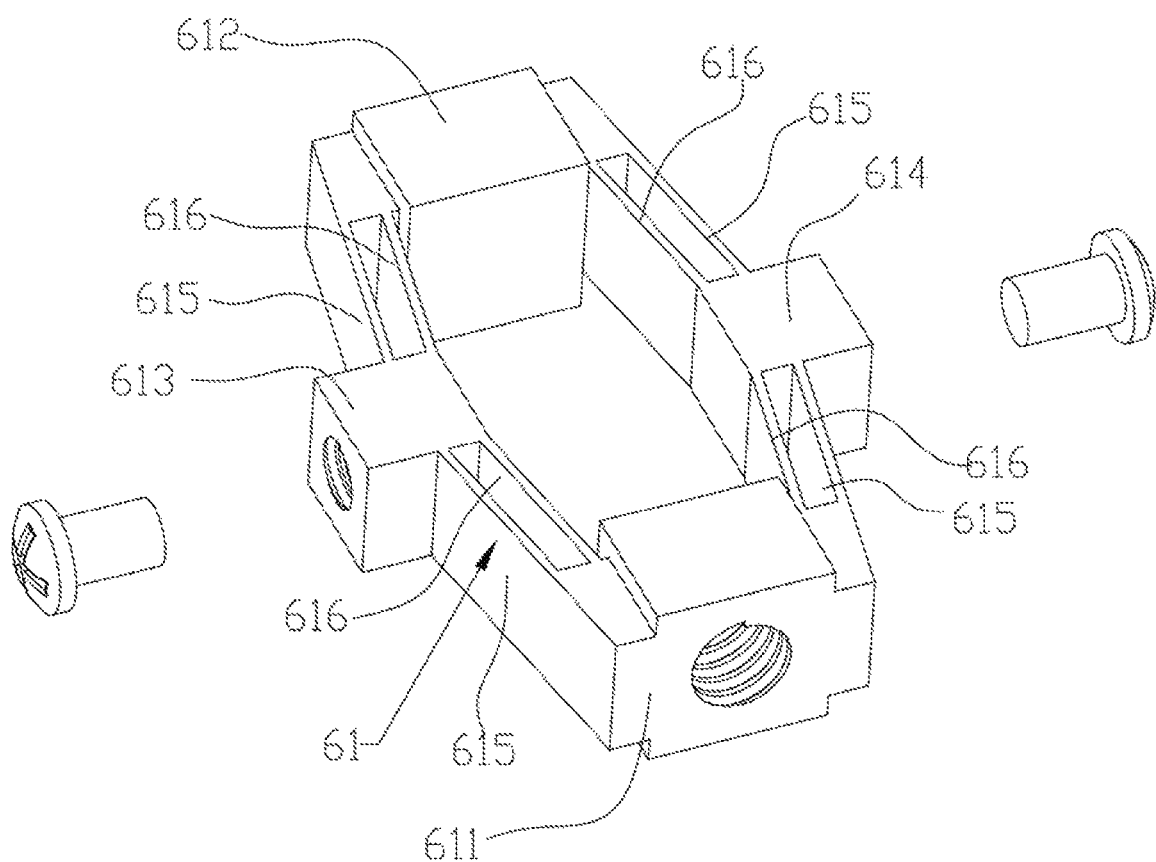
FIG. 17 is a perspective schematic structural diagram of a second bridge-type amplification mechanism in FIG. 16.

As shown in FIGS. 15, 16 and 17, the fourth drive unit 34, the fifth drive unit 35, the sixth drive unit 36 and the seventh drive unit 37 have the same structure, comprising a second piezoelectric actuator 63, and a second bridge-type amplification mechanism 61 and a third bridge-type amplification mechanism 62 which are respectively in the shape of a ring. The second bridge-type amplification mechanism 61 is parallel to the base 1. Two ends of the second piezoelectric actuator 63 are provided in an abutting manner inside the second bridge-type amplification mechanism 61. The third bridge-type amplification mechanism 62 is sleeved on the periphery of the second bridge-type amplification mechanism 61, and the plane where the third bridge-type amplification mechanism 62 is located is perpendicular to the extending and retracting direction of the second piezoelectric actuator 63. The third bridge-type amplification mechanism 62 is screwed to the second platform 2 and the base 1. When the second piezoelectric actuator 63 is energized, the second piezoelectric actuator 63 stretches the second bridge-type amplification mechanism 61, the second bridge-type amplification mechanism 61 is narrowed and brings the second piezoelectric actuator 63 to be narrowed transversely, and the height of the second piezoelectric actuator 63 is increased, and finally the corresponding portion of the second platform 2 is lifted.

In an embodiment, as shown in FIGS. 15, 16 and 17, the second bridge-type amplification mechanism 61 comprises a sixth rigid portion 611 and a seventh rigid portion 612 provided in an abutting manner at two ends of the second piezoelectric actuator 63, an eighth rigid portion 613 and a ninth rigid portion 614 respectively provided on two sides of the second piezoelectric actuator 63 and forming gaps therewith, and fifth flexible sheets 615 for connecting the sixth rigid portion 611, the eighth rigid portion 613, the seventh rigid portion 612 and the ninth rigid portion 614 two by two.

The third bridge-type amplification mechanism 62 comprises a tenth rigid portion 621 screwed to the eighth rigid portion 613, an eleventh rigid portion 622 screwed to the ninth rigid portion 614, a twelfth rigid portion 623 screwed to the second platform 2, a thirteenth rigid portion 624 screwed to the base 1, and seventh flexible sheets 625 for connecting the tenth rigid portion 621, the twelfth rigid portion 623, the eleventh rigid portion 622 and the thirteenth rigid portion 624 two by two. The second bridge-type amplification mechanism 61 and the third bridge-type amplification mechanism 62 are respectively diamond-shaped. When the second piezoelectric actuator 63 is energized, the second piezoelectric actuator 63 stretches the sixth rigid portion 611 and the seventh rigid portion 612, the fifth flexible sheets 615 are straightened from the inclined state by the sixth rigid portion 611 and the seventh rigid portion 612, the eighth rigid portion 613 and the ninth rigid portion 614 move close to each other, the tenth rigid portion 621 and the eleventh rigid portion 622 are also synchronously pulled close to each other by the eighth rigid portion 613 and the ninth rigid portion 614, the seventh flexible sheets 625 are straightened from the inclined state and stretches the twelfth rigid portion 623 and the thirteenth rigid portion 624, and finally the corresponding portion of the second platform 2 is lifted.

In the lower platform, a pair of fifth flexible sheet 615 and sixth flexible sheet 616 arranged in parallel in the second bridge-type amplification mechanism 61 constitute a single parallel four-link mechanism with the eighth rigid portion 613 and the sixth rigid portion 611, and a pair of fifth flexible sheet 615 and sixth flexible sheet 616 arranged in parallel on the other side of the eighth rigid portion 613 also constitute a single parallel four-link mechanism with the eighth rigid portion 613 and the seventh rigid portion 612, such that the two single parallel four-link mechanisms constitute a dual parallel four-link mechanism. Similarly, the fifth flexible sheets 615 and the sixth flexible sheets 616 located on two sides of the ninth rigid portion 614 also constitute a dual parallel four-link mechanism with the ninth rigid portion 614, the sixth rigid portion 611 and the seventh rigid portion 612. When the second piezoelectric actuator 63 receives a voltage, the above dual parallel four-link mechanisms enable the eighth rigid portion 613 and the ninth rigid portion 614 to output a strict translational displacement along an axis of third threaded holes 631 in the two rigid portions, such that the twelfth rigid portion also outputs a strict translational displacement along the z-axis without generating a parasitic displacement.

In the lower platform, the seventh flexible sheets 625 in the third bridge-type amplification mechanism 62 enable the twelfth rigid portion 623 to rotate both about the x-axis and the y-axis, and enables the twelfth rigid portion 623 to rotate about one axis without generating a coupled angular rotation about the other axis, and therefore enables the second platform 2 to rotate about one axis without generating a coupled angular rotation about the other axis.

Figure 12:
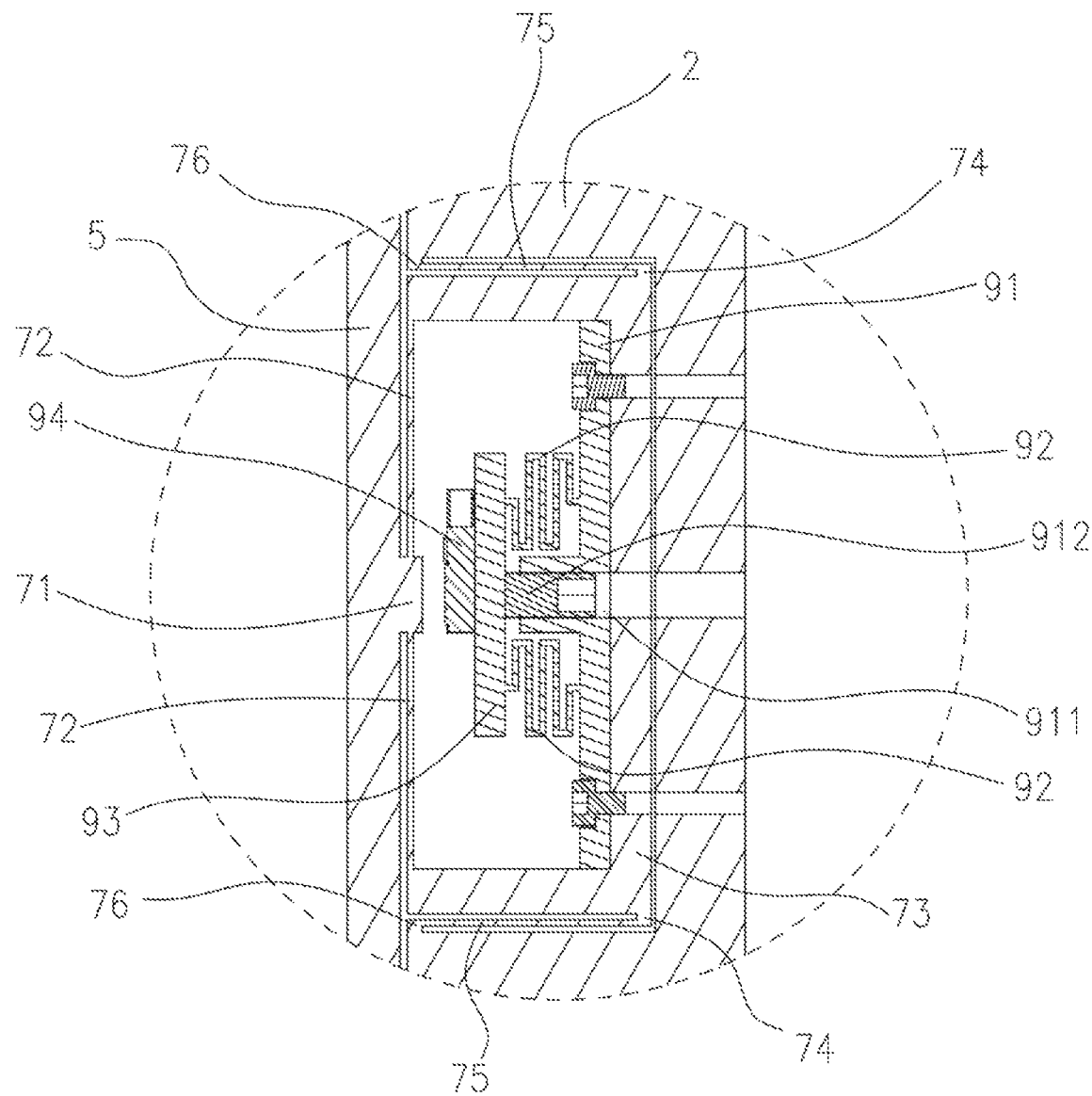
FIG. 12 is an enlarged schematic diagram of a portion B in FIG. 4.
Figure 13:
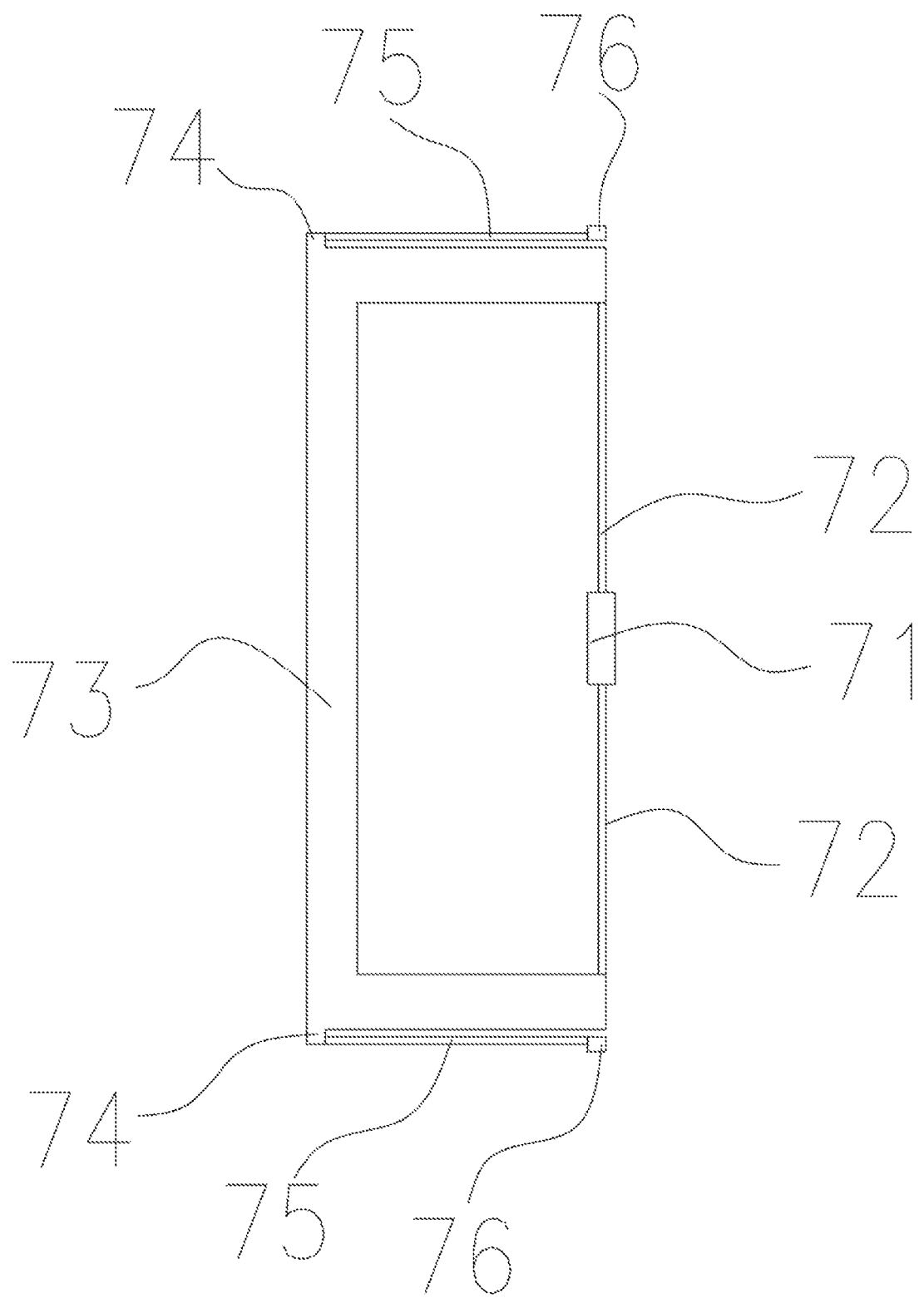
FIG. 13 is a schematic structural diagram of a guide unit in FIG. 10.
Figure 14:
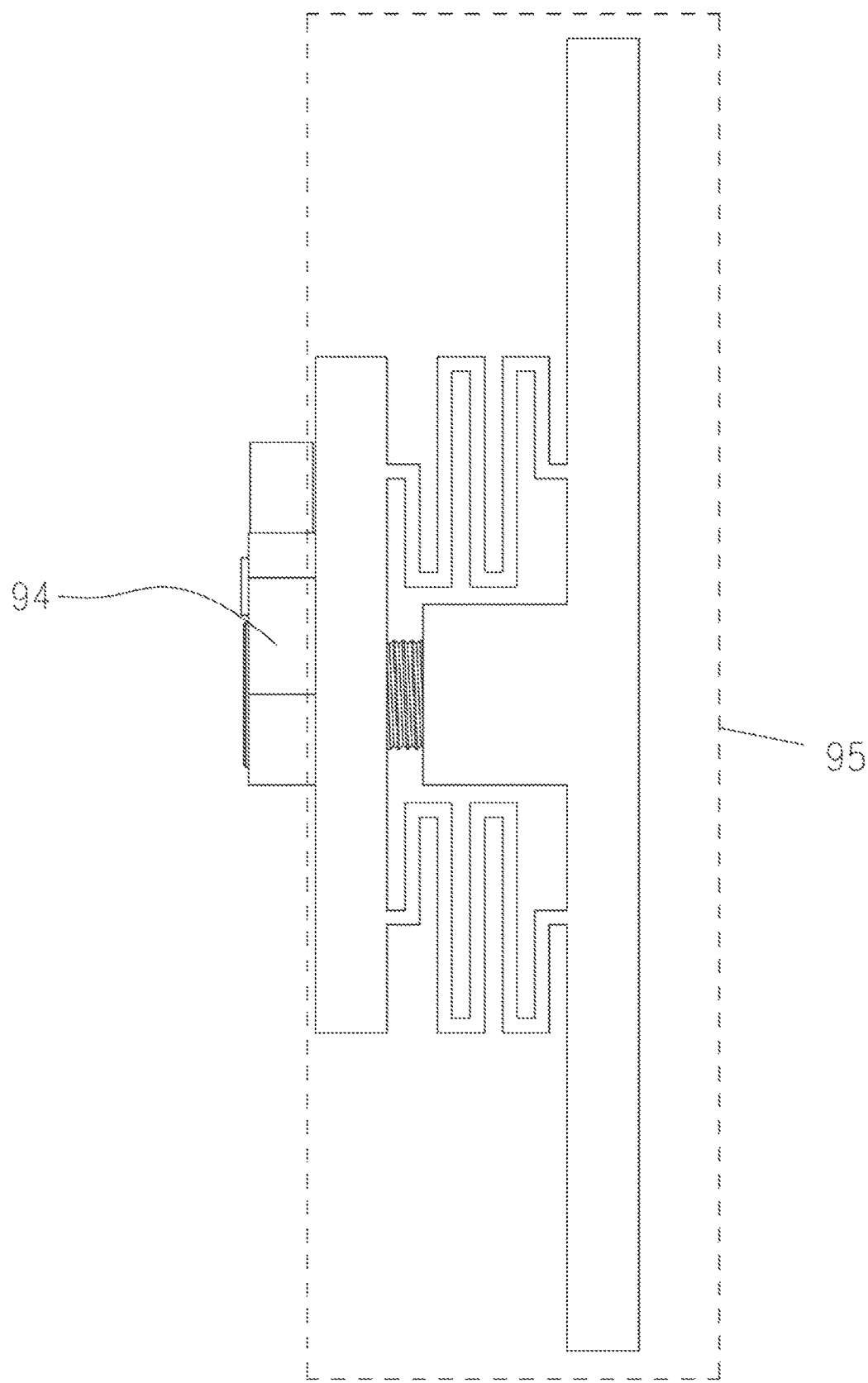
FIG. 14 is a schematic structural diagram of a first sensor assembly in FIG. 5.

In an embodiment, as shown in FIGS. 2, 3, 4, 5, 6, and 12, the first sensor assembly 41, the second sensor assembly 42 and the third sensor assembly 43 have the same structure, comprising a pedestal 95 screwed to the frame body 73, and a sensor probe 94 screwed to the pedestal 95, wherein the sensor probe 94 is directly opposite the fifth rigid portion 71. The fourth sensor assembly 44, the fifth sensor assembly 45 and the sixth sensor assembly 46 have the same structure, comprising a pedestal 95 screwed to the base 1, and a sensor probe 94 screwed to the pedestal 95, wherein the sensor probe 94 is directly opposite the second platform 2. In the embodiment, as shown in FIGS. 12 and 14, the pedestal 95 comprises a first plate 91 fixed to the base 1 or the frame body 73, and a second plate 93 parallel to the first plate 91 and fixedly connected to the sensor probe 94. A pair of flexible folded beams 92 are connected between the first plate 91 and the second plate 93. The center of the first plate 91 is provided with a first threaded hole 911, and a first screw 912 with an end abutting against the second plate 93 is screwed into the first threaded hole 911. Tightening the first screw 912 can increase the distance between the second plate 93 and the first plate 91, thereby reducing the distance between the sensor probe 94 and the fifth rigid portion 71. When the first screw 912 is loosened, the flexible folded beams 92 can reduce the distance between the second plate 93 and the first plate 91, thereby increasing the distance between the sensor probe 94 and the fifth rigid portion 71. By screwing the first screw 912, the distance between the second plate 93 and the first plate 91 can be adjusted by means of the elastic deformation of the flexible folded beams 92, thereby adjusting the distance between the sensor probe 94 and the fifth rigid portion 71.

Figure 9:
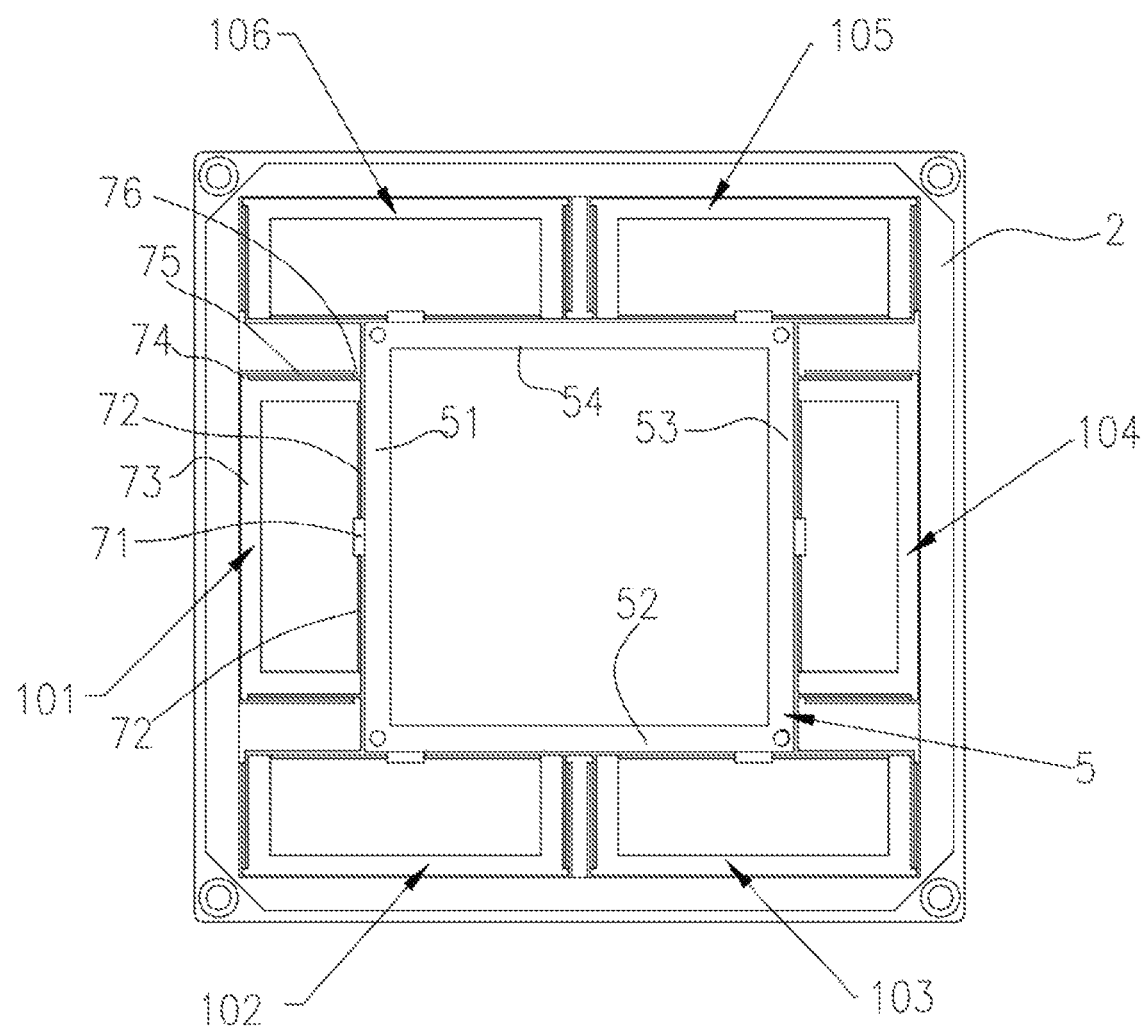
FIG. 9 is a schematic diagram of an assembly structure of the first platform, the second platform and guide units in FIG. 5.
Figure 10:
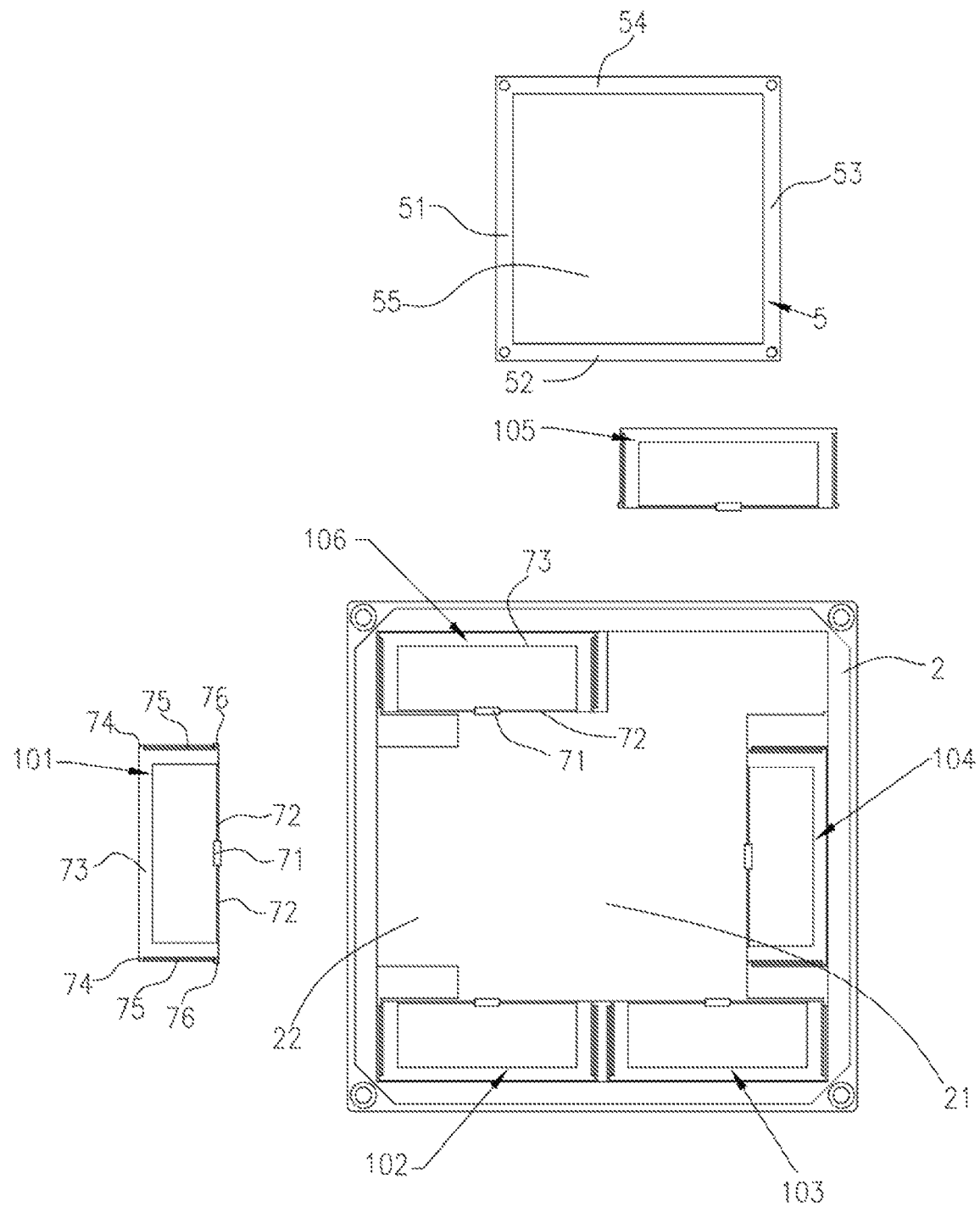
FIG. 10 is an exploded schematic diagram of FIG. 9.

In an embodiment, as shown in FIGS. 9 and 10, the second platform 2 is provided with a first accommodation groove 21 for accommodating the first platform 5 and forming a gap therewith, and a second accommodation groove 22 located at an edge of the first accommodation groove 21 and used for accommodating the first guide unit 101, the second guide unit 102, the third guide unit 103, the fourth guide unit 104, the fifth guide unit 105 and the sixth guide unit 106. The frame bodies 73 and the second flexible sheets 75 are provided inside the second accommodation groove 22 and form gaps therewith. The first accommodation groove 21 accommodates the first drive unit 31, the second drive unit 32, the third drive unit 33, the first sensor assembly 41, the second sensor assembly 42 and the third sensor assembly 43, and the second accommodation groove 22 accommodates the first platform 5, so that the overall thickness of the product of the present invention is thinner than that of the first platform 5 superimposed on the second platform 2.

In an embodiment, as shown in FIG. 7, the first platform 5 is higher than upper surfaces of the second platform 2, the first drive unit 31, the second drive unit 32 and the third drive unit 33. The first bridge-type amplification mechanism 8 further comprises fourth flexible sheets 87 for sequentially connecting the first rigid portion 81, the second rigid portion 82, the third rigid portion 83 and the fourth rigid portion 84. The fourth flexible sheets 87 are provided between the third flexible sheets 86 and the first piezoelectric actuator 85 and form gaps therewith. In the upper platform, a pair of third flexible sheet 86 and fourth flexible sheet 87 arranged in parallel in the first bridge-type amplification mechanism 101 constitute a single parallel four-link mechanism with the second rigid portion 82 and the first rigid portion 81, and a pair of third flexible sheet 86 and fourth flexible sheet 87 arranged in parallel on the other side of the second rigid portion 82 also constitute a single parallel four-link mechanism with the second rigid portion 82 and the third rigid portion 83, such that the two single parallel four-link mechanisms constitute a dual parallel four-link mechanism. Similarly, the third flexible sheets 86 and the fourth flexible sheets 87 located on two sides of the fourth rigid portion 84 also constitute a dual parallel four-link mechanism with the fourth rigid portion 84, the first rigid portion 81 and the third rigid portion 83. When the first piezoelectric actuator 85 receives a voltage, the above dual parallel four-link mechanisms enable the drive units to output a strict translational displacement through the fourth rigid portion without generating a parasitic displacement.

As shown in FIGS. 15, 16 and 17, the second bridge-type amplification mechanism 61 is provided with sixth flexible sheets 616 for connecting adjacent ones of the sixth rigid portion 611, the eighth rigid portion 613, the seventh rigid portion 612 and the ninth rigid portion 614. The sixth flexible sheets 616 are provided between the second piezoelectric actuator 63 and the fifth flexible sheets 615 and form gaps therewith. The sixth flexible sheets 616 can enhance the restoring ability of the second bridge-type amplification mechanism 61.

In an embodiment, as shown in FIG. 2, an enclosure 11 is provided on the periphery of the base 1, and a tubular body 12 penetrating the base 1 is provided at the center thereof. The enclosure 11 is provided below the second platform 2 and forms a gap therewith. The tubular body 12 is provided below the first platform 5 and forms a gap therewith. The movable platform top 6 is provided with a first hollow hole 602 adapted to the contour of the tubular body 12. The first platform 5 is provided with a second hollow hole 55 adapted to the contour of the tubular body 12. The enclosure 11 and the tubular body 12 can prevent foreign matter from entering the device. The first hollow hole 602 and the second hollow hole 55 can not only reduce the mass of the first platform 5 and the movable platform top 1, but can also serve as a light transmission aperture when the platform is used as an adjustment mechanism of an optical system.

In an embodiment, as shown in FIG. 7, the first bridge-type amplification mechanism (8) is of an integrally formed structure. The first rigid portion 81, the second rigid portion 82, the third rigid portion 83, the fourth rigid portion 84, the third flexible sheets 86 and the fourth flexible sheets 87 are of an integrally formed structure.

Figure 5:
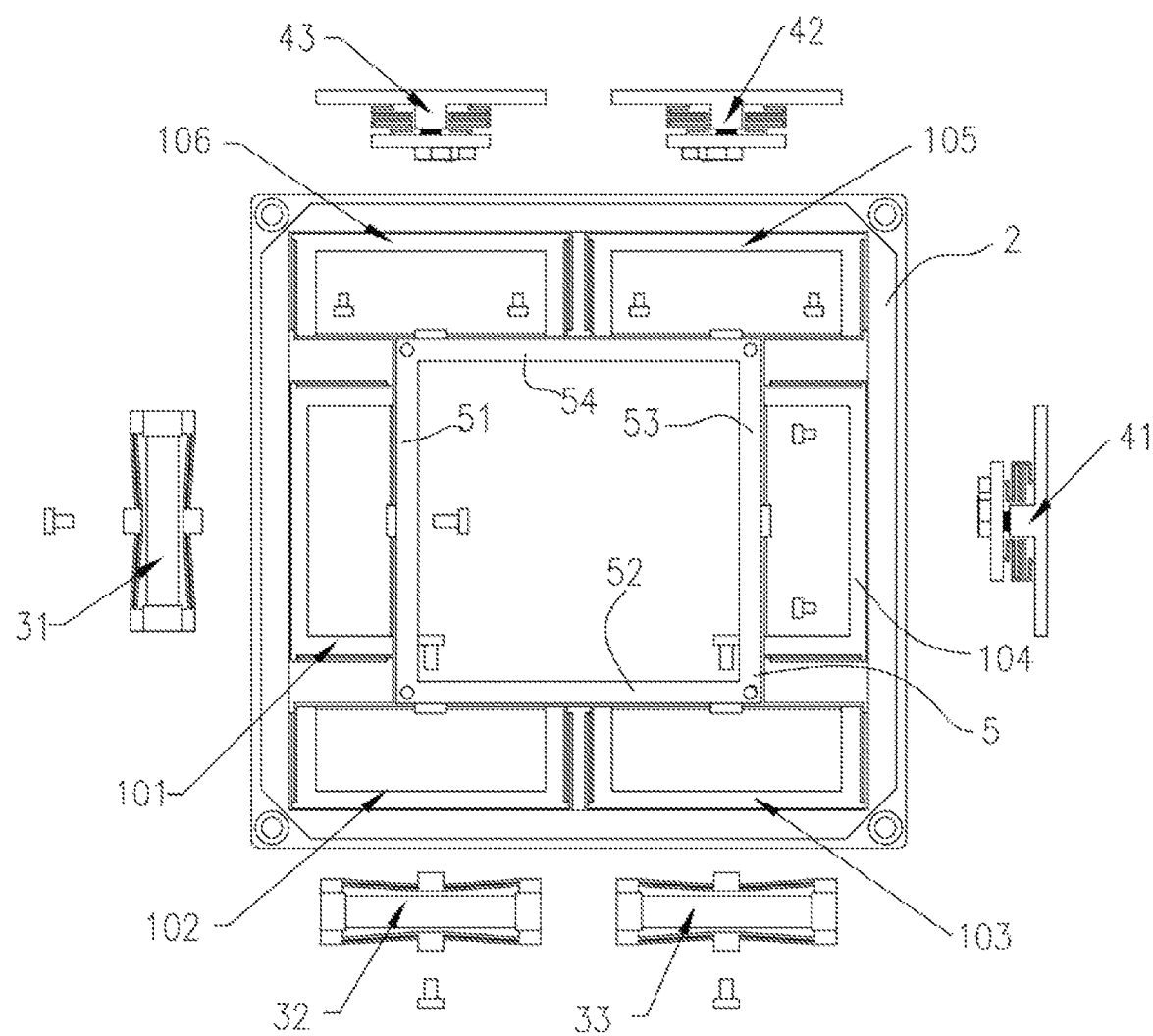
FIG. 5 is an exploded schematic diagram of FIG. 3.
Figure 6:
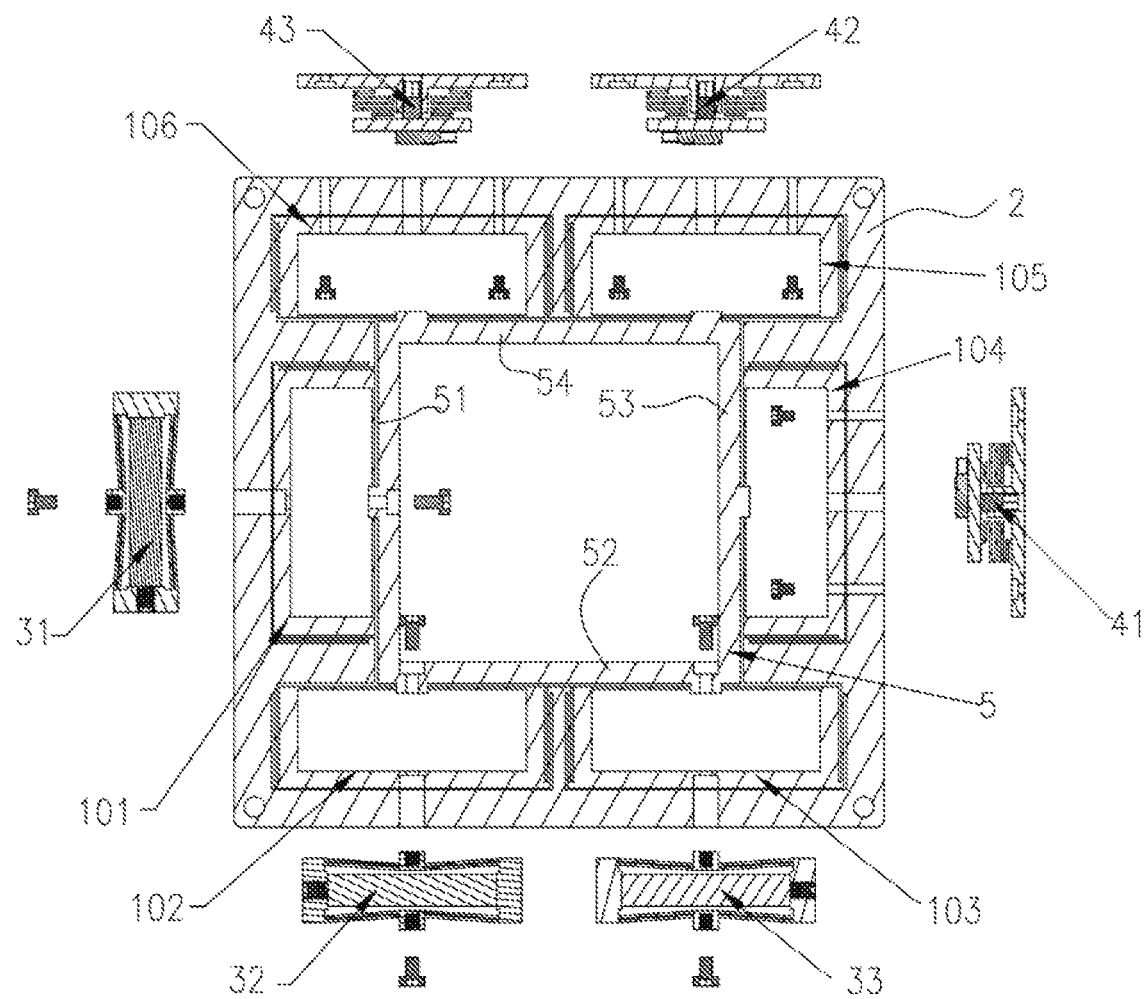
FIG. 6 is an exploded schematic diagram of FIG. 4.

As shown in FIGS. 5, 6 and 9, the first platform 5, the second platform 2, the first guide unit 101, the second guide unit 102, the third guide unit 103, the fourth guide unit 104, the fifth guide unit 105 and the sixth guide unit 106 are of an integrally formed structure, that is, the first platform 5, the second platform 2 and the guide units are integrally formed by means of cutting.

The base 1, the first bridge-type amplification mechanism 8, the second bridge-type amplification mechanism 61, the third bridge-type amplification mechanism 62, and the pedestal 95 are respectively of an integrally formed structure.

The present invention enables the movable platform to realize six-degree-of-freedom movements, and the specific working principle is as follows:

it is assumed that the z-axis is perpendicular to the movable platform top 6, the x-axis is from the fifth drive unit 35 to the sixth drive unit 36, and the y-axis is from the fifth drive unit 35 to the fourth drive unit 34, the working principle of the present invention is:

if only the fourth drive unit 34, the fifth drive unit 35, the sixth drive unit 36, and the seventh drive unit 37 are applied with the same voltage at the same time and output the same vertical displacement amount, the movable platform top 6 is lifted along the z-axis, so that the movement of the movable platform top 6 along the z-axis is achieved without generating coupled displacements in the other directions;

if only the first drive unit 31 is applied with a voltage, the first drive unit 31 pushes the first platform 5 and finally the movable platform top 6 is moved along the x-axis, so that the movement of the movable platform top 6 along the x-axis is achieved without generating coupled displacements in the other directions;

if only the second drive unit 32 and the third drive unit 33 are applied with the same voltage at the same time and output the same horizontal displacement amount, the first platform 5 moves along the y-axis together with the movable platform top 6, so that the movement of the movable platform top 6 along the y-axis is achieved without generating coupled displacements in the other directions;

if only the sixth drive unit 36 and the seventh drive unit 37 are applied with the same voltage at the same time and output the same vertical displacement amount, the movable platform top 6 rotates about the y-axis, so that the rotation of the movable platform top 6 about the y-axis is achieved without generating coupled displacements in the other directions;

if only the fourth drive unit 34 and the seventh drive unit 37 are applied with the same voltage at the same time and output the same perpendicular displacement amount, the movable platform top 6 rotates about the x-axis, so that the rotation of the movable platform top 6 about the x-axis is achieved without generating coupled displacements in the other directions; and if only the second drive unit 32 or the third drive unit 33 is applied with a voltage, the first platform 5 rotates about the z-axis together with the movable platform top 6, so that the rotation of the movable platform top 6 about the z-axis is achieved without generating coupled displacements in the other directions.

The preferred embodiments of the present invention have been explained, and various changes or modifications made by those skilled in the art will not depart from the scope of the present invention.

The invention claimed is:

1. A six-degree-of-freedom large-stroke uncoupling large hollow series-parallel piezoelectric micro-motion platform, comprising a base and a movable platform top, wherein the movable platform top is provided above the base and forms a gap with the base; a second platform is provided between the movable platform top and the base, and forms a plurality of gaps with the movable platform top and the base; a first platform screwed to the movable platform top is provided at a center of the second platform and forms a gap with the second platform; the first platform comprises a first edge, a second edge, a third edge and a fourth edge, wherein the first edge, the second edge, the third edge and the fourth edge are arranged sequentially perpendicular to each other in a counterclockwise direction of the first platform; a first guide unit with elastic deformation is connected between the second platform and the first edge; a second guide unit with elastic deformation and a third guide unit with elastic deformation are respectively connected between the second platform and the second edge; a fourth guide unit with elastic deformation is connected between the second platform and the third edge; a fifth guide unit with elastic deformation and a sixth guide unit with elastic deformation are respectively connected between the second platform and the fourth edge; the first guide unit is internally provided with a first drive unit configured to extend and retract in a direction of the first platform, the second guide unit is internally provided with a second drive unit configured to extend and retract in the direction of the first platform, and the third guide unit is internally provided with a third drive unit configured to extend and retract in the direction of the first platform;

the base is provided with a fourth drive unit, a fifth drive unit, a sixth drive unit and a seventh drive unit, wherein the fourth drive unit, the fifth drive unit, the sixth drive unit and the seventh drive unit perpendicularly extend and retract to act on the second platform; the fourth drive unit, the fifth drive unit, the sixth drive unit and the seventh drive unit are arranged sequentially in a form of a rectangle, are provided under four corners of the second platform, and are in screwed connection with the second platform; and the fifth drive unit is provided under the second drive unit, and the sixth drive unit is provided under the third drive unit.

2. The six-degree-of-freedom large-stroke uncoupling large hollow series-parallel piezoelectric micro-motion platform according to claim 1, wherein the fourth guide unit is internally provided with a first sensor assembly facing the third edge, the fifth guide unit is internally provided with a second sensor assembly facing the fourth edge, and the sixth guide unit is internally provided with a third sensor assembly facing the fourth edge; a fourth sensor assembly vertically facing the second platform is provided between the fourth drive unit and the fifth drive unit; a fifth sensor assembly vertically facing the second platform is provided between the fifth drive unit and the sixth drive unit; and a sixth sensor assembly vertically facing the second platform is provided between the sixth drive unit and the seventh drive unit.

3. The six-degree-of-freedom large-stroke uncoupling large hollow series-parallel piezoelectric micro-motion platform according to claim 2, wherein the first guide unit, the second guide unit, the third guide unit, the fourth guide unit, the fifth guide unit and the sixth guide unit have a first same structure; the first same structure comprises a fifth rigid portion connected to the first platform, a half-frame-shaped frame body enclosing an outside of the fifth rigid portion, a first flexible sheet connected between an end of the half-frame-shaped frame body and the fifth rigid portion, a first protrusion provided on the half-frame-shaped frame body, a second flexible sheet connected to the first protrusion and perpendicular to the first flexible sheet, and a second protrusion provided on the second platform and connected to an end of the second flexible sheet; the second protrusion is located between the first protrusion and the first platform;

the first drive unit, the second drive unit and the third drive unit have a second same structure; the second same structure comprises a first bridge-type amplification mechanism and a first piezoelectric actuator provided inside the first bridge-type amplification mechanism; the first piezoelectric actuator is parallel to the first flexible sheet; the first bridge-type amplification mechanism comprises a first rigid portion, a second rigid portion, a third rigid portion and a fourth rigid portion, wherein the first rigid portion is provided at a first end of the first piezoelectric actuator, the third rigid portion is provided at a second end of the first piezoelectric actuator, the second rigid portion is provided on a first side of the first piezoelectric actuator and forms a gap with the first piezoelectric actuator, and the fourth rigid portion is provided on a second side of the first piezoelectric actuator and forms a gap with the first piezoelectric actuator; a third flexible sheet is connected between adjacent ones of the first rigid portion, the second rigid portion, the third rigid portion and the fourth rigid portion; a distance between a first end of the third flexible sheet and a middle section of the first piezoelectric actuator is smaller than a distance between a second end of the third flexible sheet and an end of the first piezoelectric actuator;

the second rigid portion is screwed to the half-frame-shaped frame body, and the fourth rigid portion is screwed to the fifth rigid portion;

the fourth drive unit, the fifth drive unit, the sixth drive unit and the seventh drive unit have a third same structure; the third same structure comprises a second piezoelectric actuator, a second bridge-type amplification mechanism and a third bridge-type amplification mechanism, wherein the second bridge-type amplification mechanism and the third bridge-type amplification mechanism are respectively in a shape of a ring; the second bridge-type amplification mechanism is parallel to the base; two ends of the second piezoelectric actuator are provided in an abutting manner inside the second bridge-type amplification mechanism; the third bridge-type amplification mechanism is sleeved on a periphery of the second bridge-type amplification mechanism, and a plane which the third bridge-type amplification mechanism is located on is perpendicular to an extending and retracting direction of the second piezoelectric actuator; and the third bridge-type amplification mechanism is screwed to the second platform and the base.

4. The six-degree-of-freedom large-stroke uncoupling large hollow series-parallel piezoelectric micro-motion platform according to claim 3, wherein the second bridge-type amplification mechanism comprises a sixth rigid portion, a seventh rigid portion, an eighth rigid portion, a ninth rigid portion and a fifth flexible sheet; wherein, the sixth rigid portion is provided in an abutting manner at a first end of the second piezoelectric actuator, the seventh rigid portion is provided in an abutting manner at a second end of the second piezoelectric actuator, the eighth rigid portion is provided on a first side of the second piezoelectric actuator and forms a gap with the second piezoelectric actuator, the ninth rigid portion is provided on a second side of the second piezoelectric actuator and forms a gap with the second piezoelectric actuator, and the fifth flexible sheet for connecting the sixth rigid portion, the eighth rigid portion, the seventh rigid portion and the ninth rigid portion two by two; the third bridge-type amplification mechanism comprises a tenth rigid portion screwed to the eighth rigid portion, an eleventh rigid portion screwed to the ninth rigid portion, a twelfth rigid portion screwed to the second platform, a thirteenth rigid portion screwed to the base, and a seventh flexible sheet for connecting the tenth rigid portion, the twelfth rigid portion, the eleventh rigid portion and the thirteenth rigid portion two by two; and the second bridge-type amplification mechanism and the third bridge-type amplification mechanism are respectively diamond-shaped.

5. The six-degree-of-freedom large-stroke uncoupling large hollow series-parallel piezoelectric micro-motion platform according to claim 4, wherein the first sensor assembly, the second sensor assembly and the third sensor assembly have a fourth same structure; the fourth same structure comprises a pedestal screwed to the half-frame-shaped frame body, and a sensor probe screwed to the pedestal, wherein the sensor probe is directly opposite the fifth rigid portion; and the fourth sensor assembly, the fifth sensor assembly and the sixth sensor assembly have the same structure, comprising a pedestal screwed to the base, and a sensor probe screwed to the pedestal, wherein the sensor probe is directly opposite the second platform.

6. The six-degree-of-freedom large-stroke uncoupling large hollow series-parallel piezoelectric micro-motion platform according to claim 5, wherein the pedestal of the fourth same structure and the same structure of the fourth sensor assembly, the fifth sensor assembly and the sixth sensor assembly comprises a first plate fixed to the base or the half-frame-shaped frame body, and a second plate parallel to the first plate and fixedly connected to the sensor probe; a pair of flexible folded beams are connected between the first plate and the second plate; and a center of the first plate is provided with a first threaded hole, and a first screw is screwed into the first threaded hole, wherein an end of the first screw the abuts against the second plate.

7. The six-degree-of-freedom large-stroke uncoupling large hollow series-parallel piezoelectric micro-motion platform according to claim 5, wherein the second platform is provided with a first accommodation groove for accommodating the first platform and forming a gap with the first platform, and a second accommodation groove located at an edge of the first accommodation groove and used for accommodating the first guide unit, the second guide unit, the third guide unit, the fourth guide unit, the fifth guide unit and the sixth guide unit; and the half-frame-shaped frame body and the second flexible sheet are provided inside the second accommodation groove and form a first plurality of gaps.

8. The six-degree-of-freedom large-stroke uncoupling large hollow series-parallel piezoelectric micro-motion platform according to claim 7, wherein the first platform is higher than upper surfaces of the second platform, the first drive unit, the second drive unit and the third drive unit; the first bridge-type amplification mechanism further comprises a fourth flexible sheet for sequentially connecting the first rigid portion, the second rigid portion, the third rigid portion and the fourth rigid portion; the fourth flexible sheet is provided between the third flexible sheet and the first piezoelectric actuator, and forms a second plurality of gaps;

the second bridge-type amplification mechanism further comprises a sixth flexible sheet for connecting adjacent ones of the sixth rigid portion, the eighth rigid portion, the seventh rigid portion and the ninth rigid portion; and the sixth flexible sheet is provided between the second piezoelectric actuator and the fifth flexible sheet, and forms a third plurality of gaps.

9. The six-degree-of-freedom large-stroke uncoupling large hollow series-parallel piezoelectric micro-motion platform according to claim 8, wherein an enclosure is provided on a periphery of the base, and a tubular body penetrating the base is provided at a center of the base; the enclosure is provided under the second platform and forms a gap with the second platform; the tubular body is provided under the first platform and forms a gap with the first platform; the movable platform top is provided with a first hollow hole adapted to a contour of the tubular body; and the first platform is provided with a second hollow hole adapted to the contour of the tubular body.

10. The six-degree-of-freedom large-stroke uncoupling large hollow series-parallel piezoelectric micro-motion platform according to claim 9, wherein the first platform, the second platform, the first guide unit, the second guide unit, the third guide unit, the fourth guide unit, the fifth guide unit and the sixth guide unit are integrated; and the base, the first bridge-type amplification mechanism, the second bridge-type amplification mechanism, the third bridge-type amplification mechanism, and the pedestal of the fourth same structure and the same structure of the fourth sensor assembly, the fifth sensor assembly and the sixth sensor assembly are respectively of an integrally formed structure.

\* \* \* \* \*